United States Patent
Kong et al.

(10) Patent No.: US 11,449,347 B1
(45) Date of Patent: Sep. 20, 2022

(54) TIME-MULTIPLEXED IMPLEMENTATION OF HARDWARE ACCELERATED FUNCTIONS IN A PROGRAMMABLE INTEGRATED CIRCUIT

(71) Applicant: Xilinx, Inc., San Jose, CA (US)

(72) Inventors: Raymond Kong, San Jose, CA (US); Brian S. Martin, Longmont, CO (US); Hao Yu, Broomfield, CO (US); Jun Liu, San Jose, CA (US); Ashish Sirasao, San Jose, CA (US)

(73) Assignee: Xilinx, Inc.

( * ) Notice: Subject to any disclaimer, the term of this patent is extended or adjusted under 35 U.S.C. 154(b) by 662 days.

(21) Appl. No.: 16/421,367

(22) Filed: May 23, 2019

(51) Int. Cl.
| | |
|---|---|
| *G06F 9/445* | (2018.01) |
| *G06F 16/22* | (2019.01) |
| *G06F 9/48* | (2006.01) |
| *G06F 16/28* | (2019.01) |
| *G06F 9/50* | (2006.01) |
| *G06F 30/34* | (2020.01) |

(52) U.S. Cl.
CPC ........ *G06F 9/44505* (2013.01); *G06F 9/4881* (2013.01); *G06F 9/5066* (2013.01); *G06F 16/22* (2019.01); *G06F 16/285* (2019.01); *G06F 30/34* (2020.01)

(58) Field of Classification Search
CPC .. G06F 9/44505; G06F 9/4881; G06F 9/5066; G06F 16/22; G06F 16/285; G06F 30/34
See application file for complete search history.

(56) References Cited

U.S. PATENT DOCUMENTS

| | | | |
|---|---|---|---|
| 5,650,948 A * | 7/1997 | Gafter | G06F 8/49 |
| | | | 716/103 |
| 6,091,263 A | 7/2000 | New et al. | |
| 6,150,839 A | 11/2000 | New et al. | |
| 6,204,687 B1 | 3/2001 | Schultz et al. | |
| 6,462,579 B1 | 10/2002 | Camilleri et al. | |
| 6,507,211 B1 | 1/2003 | Schultz et al. | |
| 6,525,562 B1 | 2/2003 | Schultz et al. | |
| 6,526,557 B1 | 2/2003 | Young et al. | |
| 6,573,748 B1 | 6/2003 | Trimberger | |
| 6,625,794 B1 | 9/2003 | Trimberger | |

(Continued)

FOREIGN PATENT DOCUMENTS

WO    WO-9423389 A1 * 10/1994 ......... G06F 17/5027

OTHER PUBLICATIONS

Xilinx, Inc., "SDAccel Environment User Guide," UG1023 (v2018.3), Jan. 24, 2019, 165 pg, San Jose, CA USA.

(Continued)

*Primary Examiner* — Farley Abad
(74) *Attorney, Agent, or Firm* — Kevin T. Cuenot

(57) ABSTRACT

Time-multiplexing implementation of hardware accelerated functions includes associating each function of a plurality of functions from program code with an accelerator binary image specifying a hardware accelerated version of the associated function and determining which accelerator binary images are data independent. Using the computer hardware, the accelerator binary images can be scheduled for implementation in a programmable integrated circuit within each of a plurality of partial reconfiguration regions based on data independence.

18 Claims, 15 Drawing Sheets

(56) References Cited

U.S. PATENT DOCUMENTS

| | | |
|---|---|---|
| 6,759,869 B1 | 7/2004 | Young et al. |
| 6,810,514 B1 | 10/2004 | Alfke et al. |
| 6,836,842 B1 | 12/2004 | Guccione et al. |
| 6,907,595 B2 | 6/2005 | Curd et al. |
| 7,024,651 B1 | 4/2006 | Camilleri et al. |
| 7,057,413 B1 | 6/2006 | Young et al. |
| 7,109,750 B2 | 9/2006 | Vadi et al. |
| 7,124,338 B1 | 10/2006 | Mark et al. |
| 7,138,820 B2 | 11/2006 | Goetting et al. |
| 7,218,137 B2 | 5/2007 | Vadi et al. |
| 7,224,184 B1 | 5/2007 | Levi et al. |
| 7,233,532 B2 | 6/2007 | Vadi et al. |
| 7,235,999 B2 | 6/2007 | Goetting et al. |
| 7,302,625 B1 | 11/2007 | Payakapan et al. |
| 7,477,072 B1 | 1/2009 | Kao et al. |
| 7,478,357 B1 | 1/2009 | Mason et al. |
| 7,482,836 B2 | 1/2009 | Levi et al. |
| 7,509,617 B1 | 3/2009 | Young |
| 7,518,396 B1 | 4/2009 | Kondapalli et al. |
| 7,546,572 B1 | 6/2009 | Ballagh et al. |
| 7,599,299 B2 | 10/2009 | Goetting et al. |
| 7,619,442 B1 | 11/2009 | Mason et al. |
| 7,640,527 B1 | 12/2009 | Dorairaj et al. |
| 7,724,815 B1 | 5/2010 | Raha et al. |
| 7,746,099 B1 | 6/2010 | Chan et al. |
| 8,102,188 B1 | 1/2012 | Chan et al. |
| 8,359,448 B1 | 1/2013 | Neuendorffer |
| 8,415,974 B1 * | 4/2013 | Lysaght ........... H03K 19/17756 326/39 |
| 8,719,750 B1 | 5/2014 | Balzli, Jr. |
| 8,928,351 B1 | 1/2015 | Konduru |
| 9,722,613 B1 | 8/2017 | Schultz et al. |
| 2008/0072211 A1 * | 3/2008 | Rothman ............ G06F 9/44557 717/122 |
| 2018/0357098 A1 * | 12/2018 | Dube .................... G06F 9/4856 |
| 2019/0034363 A1 * | 1/2019 | Palermo .............. G06F 12/0875 |

OTHER PUBLICATIONS

U.S. Appl. No. 16/041,602, filed Jul. 20, 2018, San Jose, CA USA.
U.S. Appl. No. 16/141,723, filed Sep. 25, 2018, San Jose, CA USA.

* cited by examiner

US 11,449,347 B1

TIME-MULTIPLEXED IMPLEMENTATION OF HARDWARE ACCELERATED FUNCTIONS IN A PROGRAMMABLE INTEGRATED CIRCUIT

TECHNICAL FIELD

This disclosure relates to integrated circuits (ICs) and, more particularly, to time-multiplexing implementation of hardware accelerated functions in a programmable IC.

BACKGROUND

A programmable integrated circuit (IC) refers to a type of IC that includes programmable circuitry. An example of a programmable IC is a field programmable gate array (FPGA). An FPGA is characterized by the inclusion of programmable circuit blocks. Examples of programmable circuit blocks include, but are not limited to, input/output blocks (IOBs), configurable logic blocks (CLBs), dedicated random access memory blocks (BRAM), multipliers, digital signal processing blocks (DSPs), processors, clock managers, and delay lock loops (DLLs). Circuit designs may be physically implemented within the programmable circuitry of a programmable IC by loading a configuration bitstream into configuration memory of the programmable IC.

Partial reconfiguration is a process where a region of programmable circuitry within the programmable IC, referred to as a "partial reconfiguration region" or "PR region," is dynamically reconfigured by loading a partial configuration bitstream into the programmable IC. The partial configuration bitstream may specify different circuitry than previously implemented in the PR region. The partial configuration bitstream does not specify new and/or different circuitry for portions of programmable circuitry outside of the PR region. The PR region may undergo modification through partial reconfiguration, e.g., the loading of a partial configuration bitstream for the PR region, repeatedly where different partial configuration bitstreams specify different circuitry (or applications), while the other regions of the programmable circuitry of the programmable IC, referred to as "static circuitry" or a "static region," continue to operate without interruption.

When using a circuit design with a PR region, various characteristics of the PR region remain constant. While the circuitry within a PR region may change over time using partial reconfiguration technology, the boundaries of the PR region may not be changed. As such, certain characteristics such as the size of the PR region, the shape of the PR region, the connectivity of the PR region with other circuitry, and the number of PR regions remains unchanged within the programmable IC.

SUMMARY

In one aspect, a method includes associating, using computer hardware, each function of a plurality of functions from program code with an accelerator binary image specifying a hardware accelerated version of the associated function and determining, using the computer hardware, which accelerator binary images are data independent. The method also includes scheduling, using the computer hardware, the accelerator binary images for implementation in a programmable integrated circuit (IC) within each of a plurality of partial reconfiguration regions based on data independence.

In another aspect, a system includes a processor configured to initiate operations. The operations include associating each function of a plurality of functions from program code with an accelerator binary image specifying a hardware accelerated version of the associated function and determining which accelerator binary images are data independent. The operations also include scheduling the accelerator binary images for implementation in a programmable IC within each of a plurality of partial reconfiguration regions based on data independence.

In another aspect, a computer program product includes a computer readable storage medium having first program code stored thereon. The first program code is executable by computer hardware to perform operations. The operations include associating each function of a plurality of functions from second program code with an accelerator binary image specifying a hardware accelerated version of the associated function and determining which accelerator binary images are data independent. The operations also include scheduling the accelerator binary images for implementation in a programmable IC within each of a plurality of partial reconfiguration regions based on data independence.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
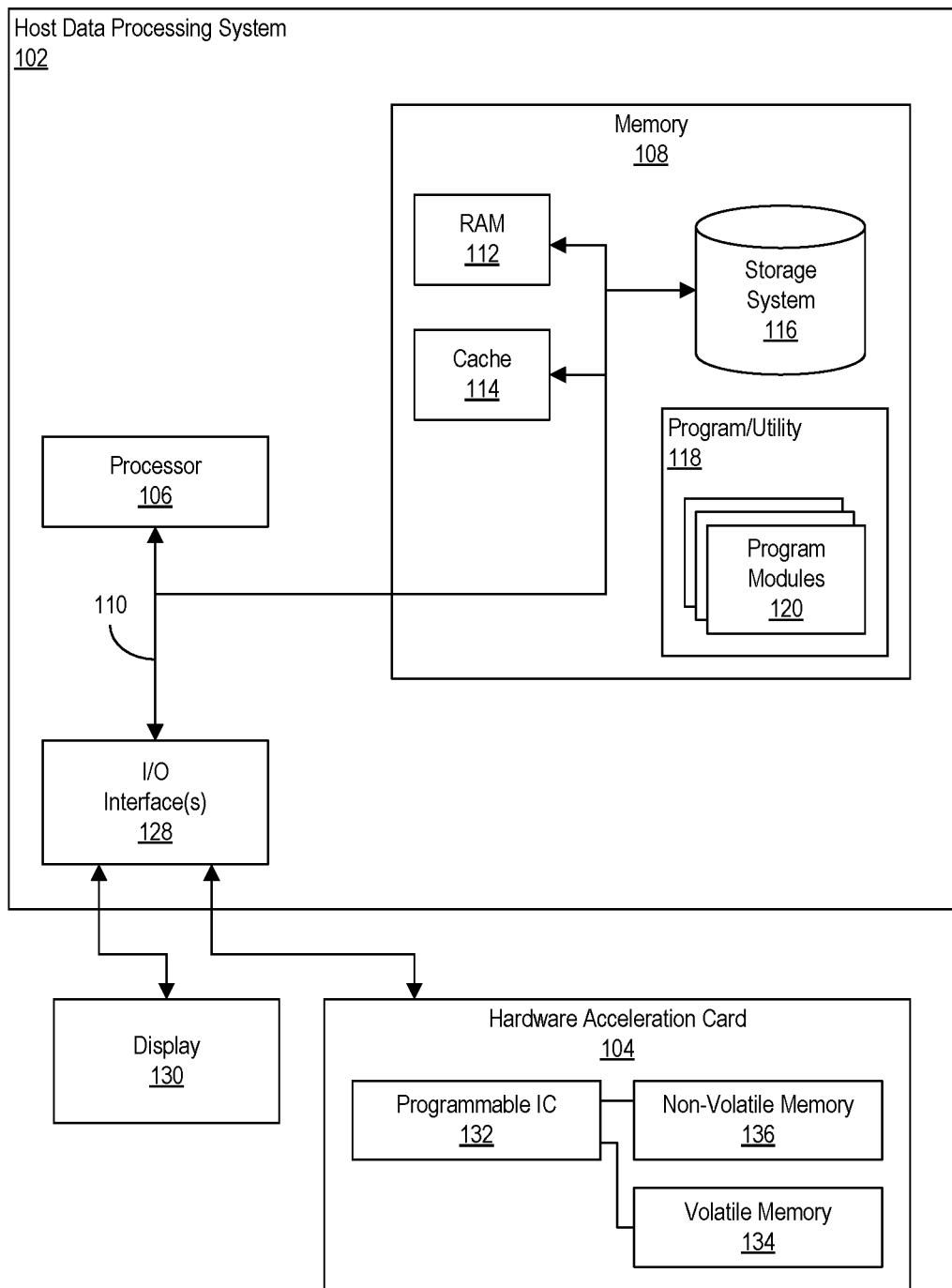
FIG. 1 illustrates an example computing environment for use with the inventive arrangements described within this disclosure

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to time-multiplexing the implementation of hardware accelerated functions in a programmable IC. In accordance with the inventive arrangements described within this disclosure, a programmable IC is configured to implement a plurality of different partially reconfigurable (PR) regions concurrently. Each PR region may be partially reconfigured to implement a particular accelerator binary image. Each accelerator binary image, when loaded into the programmable IC, implements a hardware accelerated function also referred to herein as an "accelerator."

In one aspect, a hardware scheduler is provided that is capable leveraging the PR regions of the programmable IC to time-multiplex different portions of an algorithm that is to be hardware accelerated in the programmable IC. The hardware scheduler is capable of detecting which portions of the algorithm are data independent of one another. The data independent portions of the algorithm, which correspond to functions and associated accelerator binary images, may be implemented in different PR regions of the programmable IC concurrently. The hardware scheduler may implement the algorithm by loading different groups of data independent accelerator binary images into the PR regions of the programmable IC over time. By loading data independent groups of accelerator binary images into PR regions, certain portions of the algorithm operate concurrently, which effectively time-multiplexes the hardware acceleration of the algorithm for faster execution and/or implementation.

In another aspect, a platform is provided that is implemented in a static region of programmable circuitry of the programmable IC. The platform accommodates a plurality of different PR regions. The PR regions may be of a predetermined size and shape. In one aspect, the platform is shaped to at least partially frame each of the PR regions. As an example, adjacent PR regions are separated by a portion of the static region and/or the platform. As such, two or more PR regions that are adjacent to one another do not abut or contact one another. Rather, the PR regions are separated by a channel of the static region and/or circuitry of the platform. In other aspects, however, the PR regions may abut or contact one another. In the latter case, the PR regions are not separated by a portion of the static region and/or platform. In any case, the PR regions do not overlap one another.

In still another aspect, the hardware scheduler is capable of performing prefetch operations to increase the speed of partial reconfiguration as implemented using the programmable IC. The hardware scheduler, for example, is capable of retrieving one or more of the accelerator binary images not yet implemented in the programmable IC and store the accelerator binary images in local memory of the programmable IC. This allows the programmable IC to load the accelerator binary image directly from the local memory when needed in less time than would otherwise be the case. Without performing pre-fetch, the accelerator binary images may require retrieval from remote data storage devices requiring additional time before such accelerator binary images may be downloaded to the hardware accelerator card and loaded into the programmable IC for partial reconfiguration. In some cases, one or more shadow PR regions may be used to further increase the speed, or perceived speed, of partial reconfiguration of the programmable IC.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing environment 100 for use with the inventive arrangements described within this disclosure. The computing environment includes a host data processing system (host system) 102 coupled to a hardware acceleration card (card) 104. The components of host system 102 may include, but are not limited to, one or more processors 106 (e.g., central processing units), a memory 108, and a bus 110 that couples various system components including memory 108 to processor(s) 106. Processor(s) 106 may include any of a variety of processors that are capable of executing program code. Example processor types include, but are not limited to, processors having an x86 type of architecture (IA-32, IA-64, etc.), Power Architecture, ARM processors, and the like.

Bus 110 represents one or more of any of several types of communication bus structures, including a memory bus or memory controller, a peripheral bus, an accelerated graphics port, and a processor or local bus using any of a variety of available bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Host system 102 typically includes a variety of computer readable media. Such media may be any available media that is accessible by host system 102 and may include any combination of volatile media, non-volatile media, removable media, and/or non-removable media.

Memory 108 may include computer readable media in the form of volatile memory, such as random-access memory (RAM) 112 and/or cache memory 114. Host system 102 may also include other removable/non-removable, volatile/non-volatile computer system storage media. By way of example, storage system 116 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 110 by one or more data media interfaces. As will be further depicted and described below, memory 108 may include at least one computer program product having a set (e.g., at least one) of program modules (e.g., program code) that are configured to carry out the functions and/or operations described within this disclosure.

For example, program/utility 118, having a set (at least one) of program modules 120 which may include, but are not limited to, an operating system, one or more application programs, other program modules, and/or program data, is stored in memory 108. Program modules 120 generally carry out the functions and/or methodologies of embodiments of the invention as described herein at least with respect to operations performed by host system 102. For example, program modules 120 may implement a software stack. The software stack may implement a runtime environment capable of performing the host system 102 operations described herein. In one aspect, program modules 120 includes a driver or daemon capable of communicating with programmable IC 132.

Program/utility 118 is executable by processor(s) 106. Program/utility 118 and any data items used, generated, and/or operated upon by processor(s) 106 are functional data structures that impart functionality when employed by processor(s) 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Host system 102 may include one or more Input/Output (I/O) interfaces 128 communicatively linked to bus 110. I/O interface(s) 128 allow host system 102 to communicate with external devices, couple to external devices that allow user(s) to interact with host system 102, couple to external devices that allow host system 102 to communicate with other computing devices, and the like. For example, host system 102 may be communicatively linked to a display 130 and to hardware acceleration card 104 through I/O interface (s) 128. Host system 102 may be coupled to other external devices such as a keyboard (not shown) via I/O interface(s) 128. Examples of I/O interfaces 128 may include, but are not limited to, network cards, modems, network adapters, hardware controllers, etc.

In an example implementation, the I/O interface 128 through which host system 102 communicates with hardware acceleration card 104 is a PCIe adapter. Hardware acceleration card 104 may be implemented as a circuit board that couples to host system 102. Hardware acceleration card 104 may, for example, be inserted into a card slot, e.g., an available bus and/or PCIe slot, of host system 102.

Hardware acceleration card 104 includes a programmable IC 132. Hardware acceleration card 104 also includes volatile memory 134 coupled to programmable IC 132 and a non-volatile memory 136 also coupled to programmable IC 132. Volatile memory 134 may be implemented as a RAM that is external to programmable IC 132, but is still considered a "local memory" of programmable IC 132, whereas memory 108, being within host system 102, is not considered local to programmable IC 132. In some implementations, volatile memory 134 may include multiple gigabytes of RAM, e.g., 64 GB of RAM. Non-volatile memory 136 may be implemented as flash memory. Non-volatile memory 136 is also external to programmable IC 132 and may be considered local to programmable IC 132.

FIG. 1 is not intended to suggest any limitation as to the scope of use or functionality of the examples described herein. Host system 102 is an example of computer hardware (e.g., a system) that is capable of performing the various operations described within this disclosure relating to hardware acceleration card 104 and/or programmable IC 132.

Host system 102 is only one example implementation of a computer that may be used with a hardware acceleration card. Host system 102 is shown in the form of a computing device, e.g., a computer or server. Host system 102 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Some computing environments, e.g., cloud computing environments and/or edge computing environments using host system 102 or other suitable data processing system, generally support the FPGA-as-a-Service (FaaS) model. In the FaaS model, user functions are hardware accelerated as user-specified, or custom, circuit designs and implemented within programmable ICs operating under control of the (host) data processing systems. Other examples of cloud computing models are described in the National Institute of Standards and Technology (NIST) and, more particularly, the Information Technology Laboratory of NIST.

Host system 102 is operational with numerous other general-purpose or special-purpose computing system environments or configurations. Examples of computing systems, environments, and/or configurations that may be suitable for use with host system 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 2:
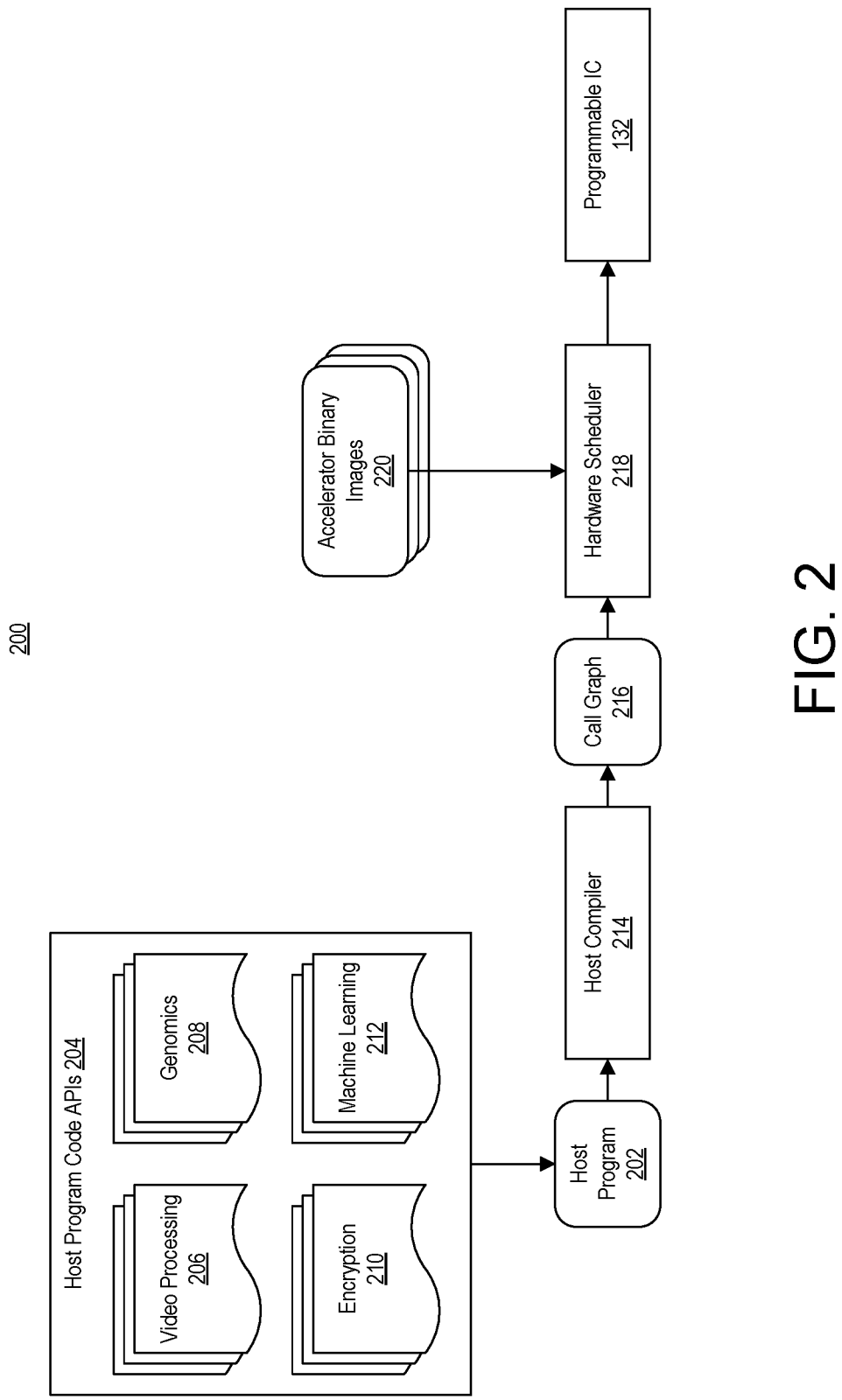
FIG. 2 illustrates an example software architecture that is executable by the host system described in connection with FIG. 1.

FIG. 2 illustrates an example software architecture 200 that is executable by host system 102 described in connection with FIG. 1. In one aspect, program modules 120 may implement software architecture 200. In the example of FIG. 2, a host program 202 is created using host program code application programming interfaces (APIs) 204. For purposes of illustration, host program code APIs 204 include one or more video processing functions 206, one or more genomics functions 208, one or more encryption functions 210, and one or more machine learning functions 212. Host program code APIs may include any of a variety of other functions not illustrated in FIG. 2.

For example, host program code APIs 204 may be provided in a high-level programming language (HLL) that a user may use to write host program 202. Host program 202 may be executed by host system 102 using software architecture 200. A host compiler 214 receives host program 202 and performs a variety of different operations.

In one aspect, host compiler 214 is capable of correlating, or associating, functions of host program 202 with accelerator binary images 220. In other words, host compiler 214 is capable of mapping the functions of host program code APIs 204 that are included in host program 202 to particular ones of accelerator binary images 220. Each function specified in the host program code APIs 204 and/or used in host program 202 may have an associated accelerator binary image 220. For example, for each video processing function 206, for each genomics function 208, for each encryption function 210, and for each machine learning function 212, a particular accelerator binary image 220 is associated therewith.

Each accelerator binary image 220 may be implemented as a pre-compiled, partial configuration bitstream. Each accelerator binary image 220 may be pre-validated for timing and hardware implementation. As such, each accelerator binary image 220 specifies a fully placed and routed hardware implementation of a function in host program code APIs 204. Each accelerator binary image 220 is loadable within programmable IC 132 to implement a hardware accelerated version, e.g., circuit, of the associated function in host program code APIs 204 referred to herein as an accelerator.

In one aspect, accelerator binary images 220 are included in a library of accelerator binary images. For example, accelerator binary images 220 within the library may be created and/or provided by a user or users, by one or more third parties, by the manufacturer or designer of programmable IC 132, and/or any combination thereof.

In another aspect, host compiler 214 is capable of building a call graph 216. For example, host compiler 214 is capable of analyzing host program 202 and determining the chain of functions calls included therein. Host compiler 214 is capable of generating call graph 216, which is formed of nodes interconnected by arcs, where nodes represent the functions of host program 202 and the arcs represent data flows between the functions (e.g., input and/or output arguments and/or data structures). Call graph 216, as constructed by host compiler 214, models the function calls contained in host program 202.

As noted, host compiler 214 is capable of modeling data movements between functions of host program 202 by virtue of the inputs and/or outputs for each function call. Host compiler 214, for example, is capable of detecting the data flows between functions and annotating the data flows onto call graph 216. For example, host compiler 214 is capable of annotating the arcs in call graph 216 that connect the nodes with the data flows (e.g., the input and output data flows generated by the various accelerator binary images 220).

A hardware scheduler 218 receives call graph 216. Hardware scheduler 218 is capable of analyzing call graph 216. Hardware scheduler 218 is capable of determining which of the accelerator binary images 220 specified in call graph 216 are data independent. If function X (corresponding to accelerator binary image X) and function Y (corresponding to accelerator binary image Y) of call graph 216 are data independent, then accelerator binary images X and Y are also data independent. As defined within this disclosure, the phrase "data independent" means that within a defined group of a plurality of accelerator binary images, no accelerator binary image in the group takes, as a data input, a data output generated by any other accelerator binary image in the group.

Hardware scheduler 218 is capable of creating groups of data independent accelerator binary images 220. In one aspect, the number of accelerator binary images 220 in a group is determined, or set, to the number of PR regions that may exist in programmable IC 132 concurrently given a particular platform implemented in programmable IC 132.

During runtime, hardware scheduler 218 is capable of controlling which accelerator binary image(s) 220 and/or group of accelerator binary images 220 are implemented in programmable IC 132 at any given time. For example, hardware scheduler 218 implements a first group of accelerator binary images 220 in programmable IC 132. Subsequently, hardware scheduler 218 implements a second and different group of accelerator binary images 220 in programmable IC 132. Hardware scheduler 218 may continue to implement different groups of accelerator binary images 220 in programmable IC 132 over time to hardware accelerate host program 202. In some cases, hardware scheduler 218 is capable of performing pre-fetch for implementing different accelerator binary images 220 and/or groups thereof. By implementing more than one accelerator binary image 220 in programmable IC 132 concurrently, hardware scheduler 218 effectively time-multiplexes hardware acceleration of host program 202, e.g., the algorithm specified by host program 202.

In one aspect, the operations described in connection with FIG. 2 may all be performed at runtime. More particularly, given host program 202 written using host program code APIs 204 and given accelerator binary images 220, host system 102 is capable of executing host compiler 214 and hardware scheduler 218 to perform the operations at runtime. Offline compilation is not required. Host program 202 may be implemented in programmable IC 132 in the time frame of approximately seconds or a minute depending upon the length and complexity of the functions therein as opposed to hours as is the case when performing a conventional design flow including synthesis, placement, and routing.

In the example of FIG. 2, accelerator binary images 220 and APIs 204 corresponding to such accelerator binary images 220 may be pre-built by a user (e.g., a developer) and/or a plurality of users (e.g., a development community). These pre-built APIs and binary images may be pre-built and/or validated for particular platforms. Once created, the APIs and binary images may be published and made available for use and/or inclusion in a user's application (e.g., host program 202). As such, the end user need not build the underlying binary images using EDA tools.

In the example of FIG. 2, a call graph is used as an example data structure that may be used in analyzing host program 202 to determine data dependencies in host program 202 (e.g., among host program code APIs 204 and/or associated accelerator binary images 220). It should be appreciated that use of a call graph is for purposes of illustration and not limitation. Any of a variety of other data structures (e.g., text files, structured documents, an annotated version of host program 202, etc.) capable of specifying data flows of host program 202 and/or analysis techniques (e.g., identifying data flows, function inputs and/or outputs, function connectivity in terms of being a data consumer or data producer in relation to other functions, dependency management, etc.) may be used for determining data dependencies of an algorithm, e.g., host program 202, and that such data structures and/or techniques may be used in lieu of a call graph and/or the examples described above.

Figure 3:
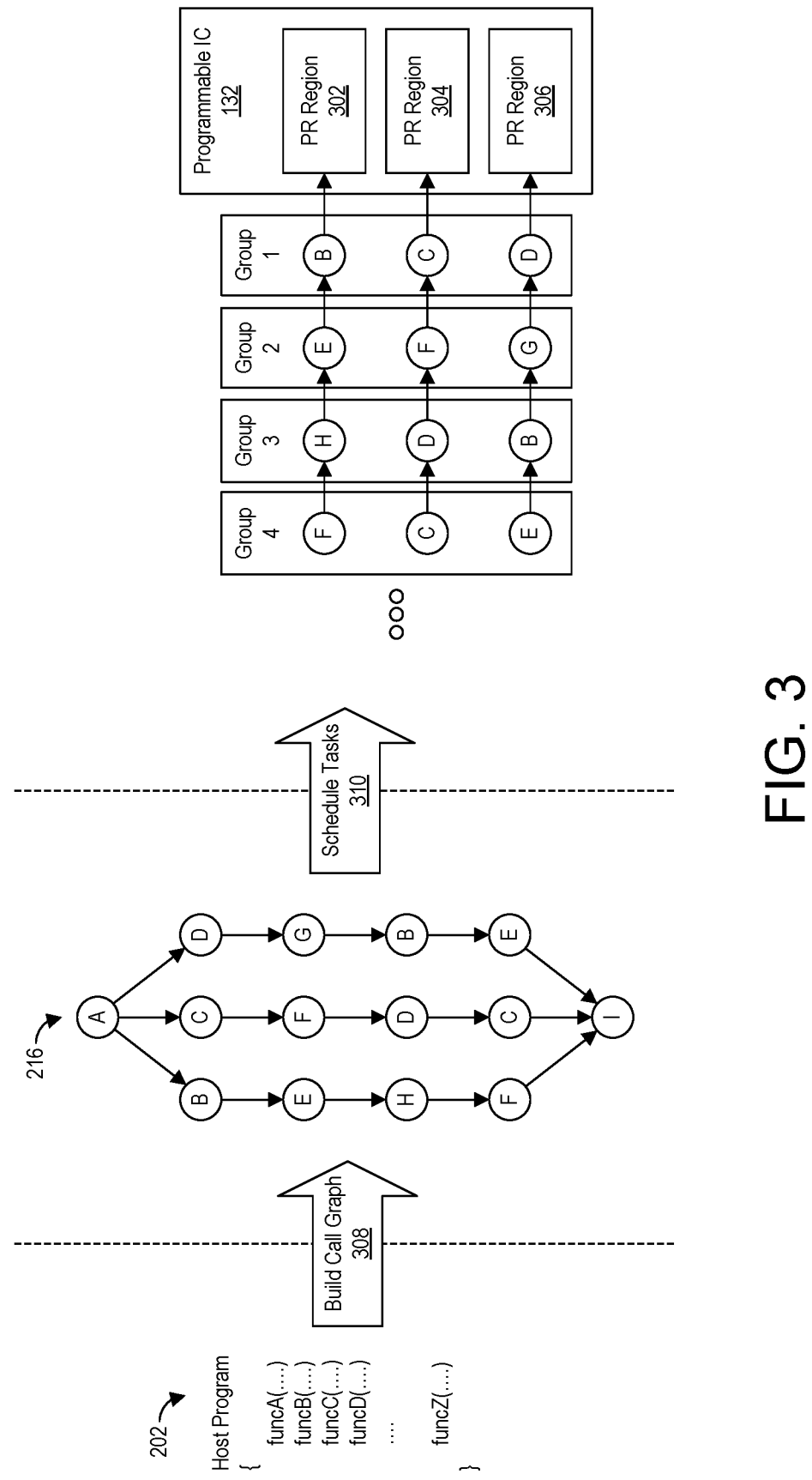
FIG. 3 illustrates example operations performed by the software architecture described in connection with FIG. 2.

FIG. 3 illustrates example operations performed by the software architecture 200 described in connection with FIG. 2. In the example of FIG. 3, programmable IC 132 includes three different PR regions 302, 304, and 306. The number of PR regions illustrated in FIG. 3 is for purposes of illustration and not limitation. Programmable IC 132 may include fewer or more PR regions than shown. The particular platform (not shown) implemented in programmable IC 132 dictates the number of PR regions implemented therein.

Each of PR regions 302, 304, and 306 is a region of programmable circuitry in programmable IC 132 that is designated to implement an accelerator binary image. Each PR region 302, 304, and 306 may be independent of one another. As such, each of PR regions 302, 304, and 306 may undergo dynamic reconfiguration to implement different circuitry therein independently of the others. In one aspect, dynamic reconfiguration of PR regions 302, 304, and 306 is controlled by hardware scheduler 218.

In the example of FIG. 3, host compiler 214 receives host program 202 as input. Host program 202 may be specified as program code specified in an HLL. Host compiler 214 is capable of performing the build call graph operation 308 to generate call graph 216. For example, host compiler 214 is capable of recognizing each of the function calls included in host program 202 (e.g., A, B, C, D, . . . and Z) and determining the inputs and outputs of each function call. Host compiler 214 is capable of creating call graph 216, where nodes represent the particular accelerator binary images that implement the function calls of host program 202. Within call graph 216, inputs/outputs of the function calls are represented as arcs connecting the nodes based on data flows of host program 202.

Hardware scheduler 218 is capable of operating on call graph 216 (or, for example, another data structure used in lieu of call graph 216) to perform the schedule tasks operation 310 (e.g., scheduling call graph 216). Hardware scheduler 218 determines which nodes, and as such, accelerator binary images, of call graph 216 are data independent. Hardware scheduler 218 assigns data independent accelerator binary images to same groups. The maximum number of accelerator binary images included in each group may be the number of PR regions used in programmable IC 132. In this example, since programmable IC 132 includes three PR regions, each group formed by hardware scheduler 218 includes a maximum of three accelerator binary images.

As can be observed from call graph 216, nodes in same rows (e.g., B, C, and D in row 1; E, F, and G in row 2; H, D and B in row 3; and F, C, and E in row 4) are data independent of one another. As such, hardware scheduler 218 generates a plurality of different groups shown as group 1, group 2, group 3, and group 4. Group 1 includes nodes B, C, and D. Group 2 includes nodes E, F, and G. Group 3 includes nodes H, D, and B. Group 4 includes nodes F, C, and E. Each group includes only nodes (e.g., accelerator binary images) that are data independent of one another.

Hardware scheduler 218 implements accelerator binary images B, C, and D of group 1 in PR regions 302, 304, and 306, respectively. Binary images in a same group are implemented concurrently within programmable IC 132. Hardware scheduler 218 implements the accelerator binary images using partial reconfiguration for each PR region 302, 304, and 306. Subsequently, for example, when the accelerator binary images have completed processing, hardware scheduler 218 implements accelerator binary images E, F, and G of group 2 in PR regions 302, 304, and 306, respectively. Hardware scheduler 218 implements the binary images using partial reconfiguration for each PR region 302, 304, and 306. Hardware scheduler 218 can continue implementing different groups of accelerator binary images in programmable IC 132 over time to implement host program 202 therein.

Figure 4:
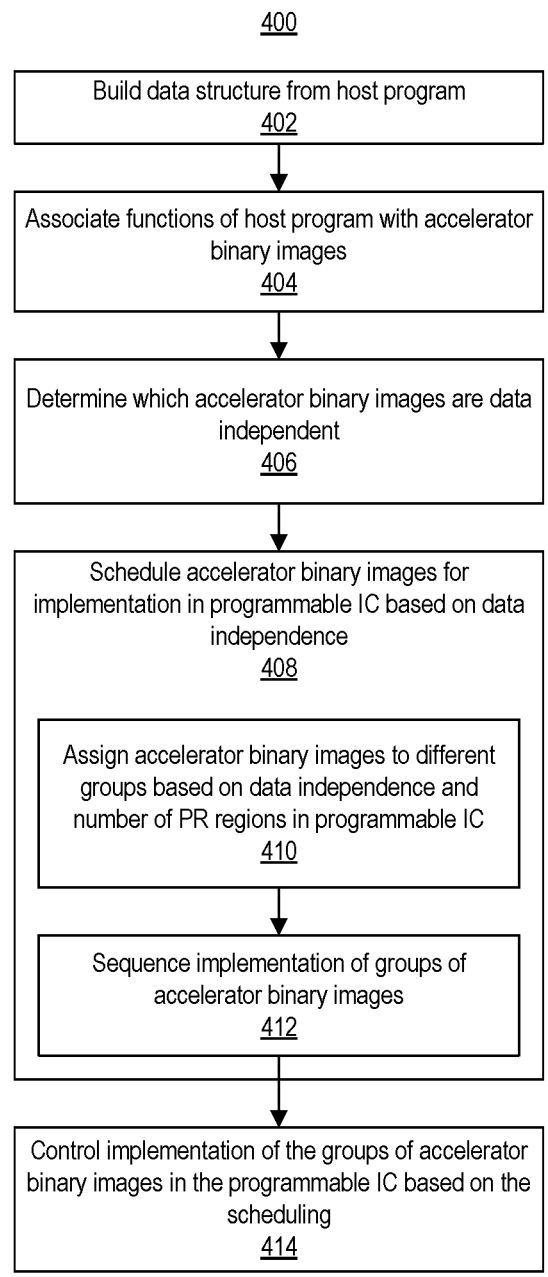
FIG. 4 illustrates an example method of operation of the computing environment described in connection with FIG. 1.

FIG. 3 illustrates the time-multiplexing that is achieved by implementing multiple, different portions of the algorithm specified by host program 202 concurrently. By recognizing those portions of host program 202 that are data independent, hardware scheduler 218 is capable of parallelizing those portions of host program 202 using grouping and the different PR regions available in programmable IC 132. Further, hardware scheduler 218 is capable of sequencing the groups (e.g., determining an order or sequence of implementation of the groups in programmable IC 132). Hardware scheduler 218 is capable of scheduling the entirety of host program 202 onto PR regions of programmable IC 132. Once scheduled, hardware scheduler 218 is capable of overseeing or managing the entire sequence of execution (e.g., of implementation of groups within programmable IC 132 to hardware accelerate host program 202). In addition, time-multiplexing allows sharing of the same set of physical resources of programmable IC 132 over time. This sharing allows programmable IC 132 to implement a large application that would not otherwise fit within programmable IC 132. For example, without the time-multiplexing, the entire application would need to be implemented within programmable IC 132 at the same time (which may not be possible) as opposed to implementing different portions of the application at different times using resource sharing. FIG. 4 illustrates an example method 400 of operation of computing environment 100 described in connection with FIG. 1. More particularly, method 400 illustrates example operations performed by host system 102 to hardware accelerate host program code using programmable IC 132. Method 400 may begin in a state where a user has created a host program as described in connection with FIGS. 2 and 3.

In block 402, the host compiler optionally builds a data structure from the host program. The data structure may specify data flows of the host program. In one aspect, the data structure is a call graph. The call graph includes a plurality of interconnected nodes where each node represents a function from the host program. Nodes are interconnected by arcs representing data flows into and out from the respective nodes.

As discussed, the host compiler is capable of generating any of a variety of alternative data structures that can be used in analyzing the host program and which may be used in place of the call graph. In one aspect, for example, the host compiler may operate directly on the host program to perform the associating and data dependency analysis described in connection with blocks 404 and 406 below. For example, the host compiler may generate the data structure, which may include an annotated version of the host program or any of the other examples described herein in connection with and/or while performing blocks 404 and/or 406.

In block 404, the host compiler associates functions of the host program (e.g., the functions represented in the call graph) with accelerator binary images. The accelerator binary images may be prebuilt and stored within a data storage device included within and/or accessible by the host system.

In block 406, the hardware scheduler determines which accelerator binary images are data independent. In one aspect, the hardware scheduler performs the determination using, or based on, the data structure. In block 408, the hardware scheduler is capable of scheduling the accelerator binary images for implementation in the programmable IC based on the data independence. The hardware scheduler is also capable of scheduling the accelerator binary images based on the call graph and the connectivity among nodes specified therein.

In one aspect, scheduling the accelerator binary images may include one or more operations. For example, in block 410, the hardware scheduler is capable of assigning accelerator binary images to different groups based on data independence and the number of PR regions to be used within the programmable IC. In block 412, the hardware scheduler is capable of sequencing implementation of the groups of accelerator binary images for implementation within the programmable IC based on the call graph.

In block 414, the host system, e.g., the hardware scheduler, is capable of controlling implementation of the groups of accelerator binary images in the programmable IC based on the scheduling. The hardware scheduler, for example, causes the first group of accelerator binary images to be implemented in the PR regions of the programmable IC. Subsequently, when the accelerators implemented in the PR regions have finished operation, the hardware scheduler implements the next group of accelerator binary images in the programmable IC. The hardware scheduler continues implementing different groups of the accelerator binary images in the programmable IC over time based on the scheduling performed in block 408 (e.g., according to the sequence determined in block 412).

In another aspect, the hardware scheduler is capable of performing pre-fetch of one or more next binary images for subsequent kernel executions as described herein in greater detail below. As such, the hardware scheduler is capable performing both scheduling of data independent operations and pre-fetch of the next binary image(s) (e.g., a group or set) for subsequent kernel executions.

Figure 5:
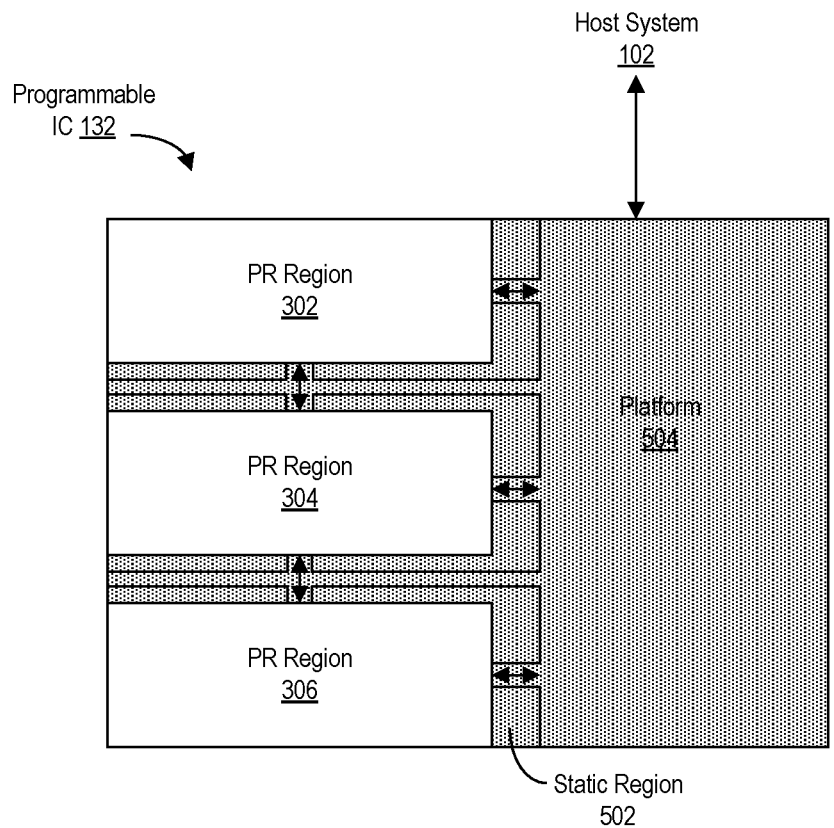
FIG. 5 illustrates an example platform implemented in the programmable integrated circuit (IC) of FIG. 1.

FIG. 5 illustrates an example platform implemented in programmable IC 132 of FIG. 1. Programmable IC 132 includes a static region 502 of programmable circuitry and a plurality of PR regions 302, 304, and 306 of programmable circuitry. Each of the PR regions 302, 304, and 306 is considered a dynamic region. While static region 502 is implemented using programmable circuitry, it should be appreciated that static region 502 may also include one or more hardwired circuit blocks.

Static region 502 represents a region of programmable circuitry of programmable IC 132 that, once configured with a circuit design, does not change over time. For purposes of illustration, static region 502 is shown with shading and is used to implement a platform 504 that supports multiple different and independent PR regions. Platform 504 is specified by a circuit design that is loaded into programmable IC 132, e.g., as a configuration bitstream or a partial configuration bitstream (e.g., a binary image). Platform 504 implements various circuit blocks in the shaded region. For example, platform 504 may implement a communication interface to host system 102 and optionally one or more memory interfaces for accessing volatile memory 134 and/or non-volatile memory 136. Platform 504 may also implement one or more communication interfaces to PR regions 302, 304, and 306 and/or between PR regions 302, 304, and 306. For purposes of illustration the communication interfaces implemented by platform 504 are represented as bi-directional arrows in FIG. 5.

Platform 504 is capable of passing data between programmable IC 132, e.g., each of the various PR regions 302, 304, and 306, and host system 102. Platform 504 is also capable of passing data between different ones of PR regions 302, 304, and 306. For example, adjacent PR regions may be connected by the communication interfaces implemented by platform 504. It should be appreciated that each PR region may have more than one communication interface to platform 504 and/or to another PR region. The number of communication interfaces shown is for purposes of illustration and not limitation.

Each of PR regions 302, 304, and 306 is a region of programmable circuitry of programmable IC 132 that may be dynamically reconfigured over time to implement different circuits, also referred to as accelerators, therein. Each PR region 302, 304, and 306 is pre-configured in terms of size and available programmable circuit resources therein to work with platform 504. The accelerators are designed to fit into PR regions 302, 304, and 306. For example, each different accelerator binary image 220 may be loaded into a particular PR region 302, 304, or 306. Loading an accelerator binary image 220 into programmable IC 132, e.g., the configuration memory cells of programmable IC 132, implements an accelerator in a PR region and establishes connectivity between the accelerator and the available communication interfaces provided by platform 504. Each different PR region is independently reconfigurable.

As pictured, each PR region is at least partially framed by static region 502 and/or platform 504. Further, each PR region is separated from each other PR region by a portion of static region 502 and platform 504. For example, PR regions 302, 304, and 306 do not abut one another, but rather are separated from one another by a channel of circuitry of platform 504. As such, adjacent ones of the PR regions (e.g., PR regions 302 and 304; and PR regions 304 and 306) are separated by a portion of static region 502 and platform 504.

Thus, static region 502, in effect, refers to the portions of programmable IC 132 that are external to PR regions 302, 304, and 306. Platform 504, being implemented in static region 502, does not change, e.g., remains static, while circuitry in PR regions 302, 304, and 306 can be changed to implement other, different accelerators over time. By implementing platform 504, any combination of PR regions 302, 304, and/or 306 (one or more or all) may be dynamically reconfigured without interrupting operation of platform 504. Thus, operations such as communicating with host system 102 continue operating uninterrupted despite one or more or all of PR regions 302, 304, and/or 306 being dynamically reconfigured. This means that programmable IC 132 is capable of maintaining a communication link with host system 102 whether or not PR region 302, 304, and/or 306 is undergoing dynamic reconfiguration.

As discussed, in another aspect, PR regions 302, 304, and 306 may abut or contact one another. In such an implementation, PR regions 302, 304, and 306 are not separated by a portion of the static region and/or platform.

Figure 6:
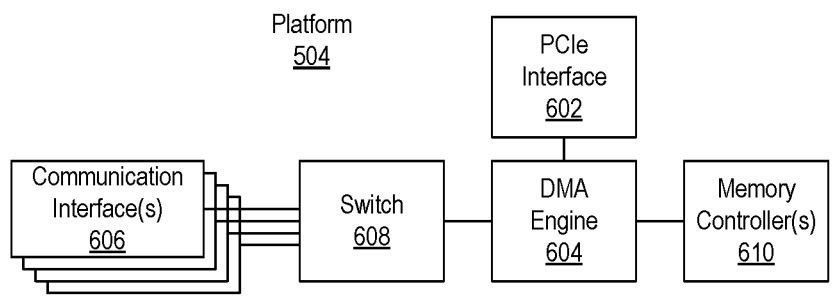
FIG. 6 illustrates an example implementation of a platform.

FIG. 6 illustrates an example implementation of platform 504. As noted, platform 504 may be implemented in programmable IC 132 by loading a configuration bitstream or a partial configuration bitstream therein.

In the example of FIG. 6, platform 504 includes Peripheral Component Interconnect Express (PCIe) interface 602 connected to a direct memory access (DMA) engine 604. Platform 504 includes a plurality of communication interfaces 606 that may be connected to DMA engine 604 via a switch 608. Platform 504 optionally includes one or more memory controllers 610 that are capable of connecting to off-chip volatile memory (e.g., DDR memory) such as volatile memory 134.

In an example implementation, communication interfaces 606 are implemented as an on-chip interconnect. An example of an on-chip interconnect is an Advanced Microcontroller Bus Architecture (AMBA) eXtensible Interface (AXI) bus. An AMBA AXI bus is an embedded microcontroller bus interface for use in establishing on-chip connections between circuit blocks and/or systems. AXI is provided as an illustrative example of a communication interface and is not intended as a limitation of the embodiments described within this disclosure. Other examples of communication interfaces include, but are not limited to, other types of buses, a network-on-chip (NoC), a cross-bar, or other type of switch.

In another example implementation, communication interfaces 606 and switch 608 may be implemented as a multi-ported switch, where each communication interface 606 is implemented as one or more input ports and one or more output ports on the switch. Connections to the ports may be established by routing wires from the different PR regions implemented in programmable IC 132 to the respective ports of the multi-ported switch.

As discussed, because platform 504 includes components such as PCIe interface 602, DMA engine 604, and/or memory controller(s) 610, programmable IC 132 is capable of maintaining a communication link with host system 102 while one or more or all of the PR regions are dynamically reconfigured. Circuit blocks in platform 504 continue to operate uninterrupted while the PR region(s) undergo partial reconfiguration. It should be appreciated that the particular interface used to communicate with host system 102 may be one other than PCIe, e.g., an endpoint configured to operate with any of the example bus architectures described herein in connection with host system 102.

Figure 7:
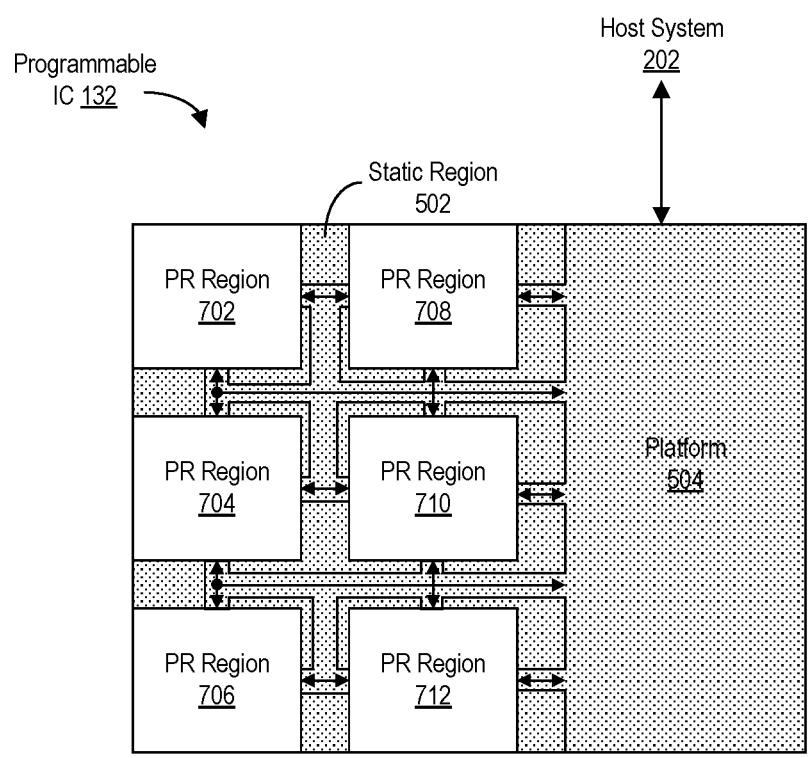
FIG. 7 illustrates another example of a platform.

FIG. 7 illustrates another example of platform 504. In the example of FIG. 7, platform 504 supports six different PR regions 702, 704, 706, 708, 710, and 712. In one aspect, platform 504 provides communication interfaces to each PR region so that each PR region has a direct connection to platform 504. Platform 504 may also provide communication interfaces that directly link two different PR regions as shown. in the example of FIG. 7, while PR regions 702, 704, and 706 are partially framed by static region 502 and/or platform 504, PR regions 708, 710, and 712 are fully framed by static region 502 and/or platform 504.

Figure 8:
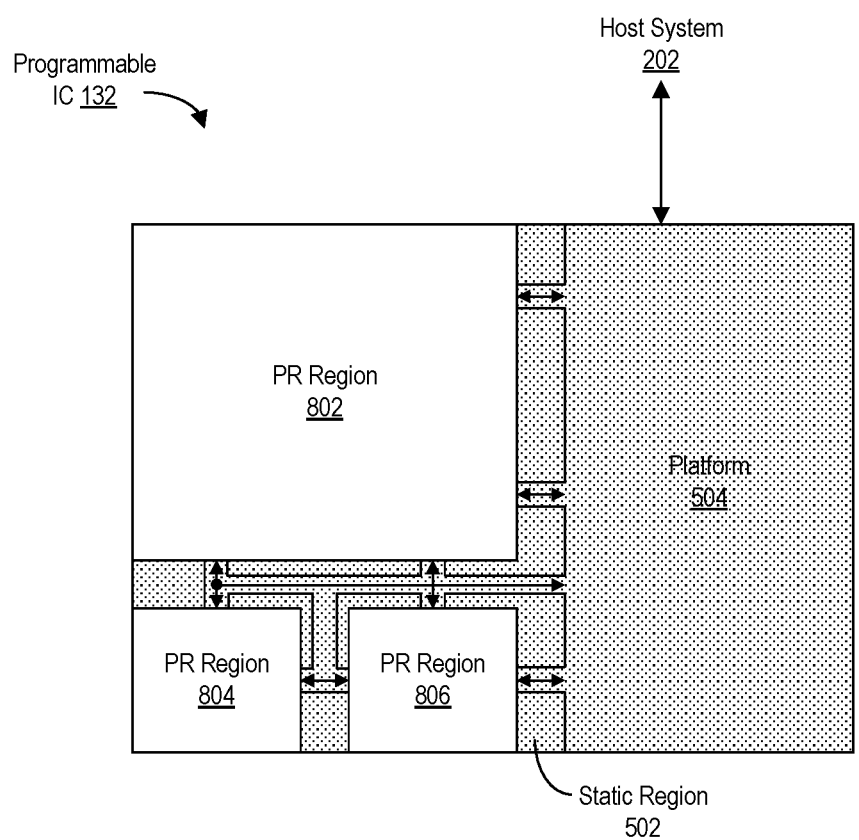
FIG. 8 illustrates another example of a platform.

FIG. 8 illustrates another example of platform 504. In the example of FIG. 8, platform 504 supports three different PR regions 802, 804, and 806. In one aspect, platform 504 provides communication interfaces to each PR region so that each PR region has a direct connection to platform 504. Platform 504 may also provide communication interfaces that directly link two different PR regions as shown.

As discussed, in another aspect, PR regions 802, 804, and 806 may abut or contact one another. In such an implementation, PR regions 802, 804, and 806 are not separated by a portion of the static region and/or platform.

FIGS. 5-8 illustrate that any of a variety of different PR region configurations may be implemented in programmable IC 132 depending on the particular implementation of platform 504 that is used. For example, a variety of different versions of platform 504 may be stored (e.g., different configuration bitstreams or partial configuration bitstreams) specifying different versions of platform 504. These different versions of platform 504 may be loaded into programmable IC 132 over time depending upon the needs of users.

As pictured in FIG. 8, the PR regions may be sized differently, e.g., be non-uniform in size.

Figure 9:
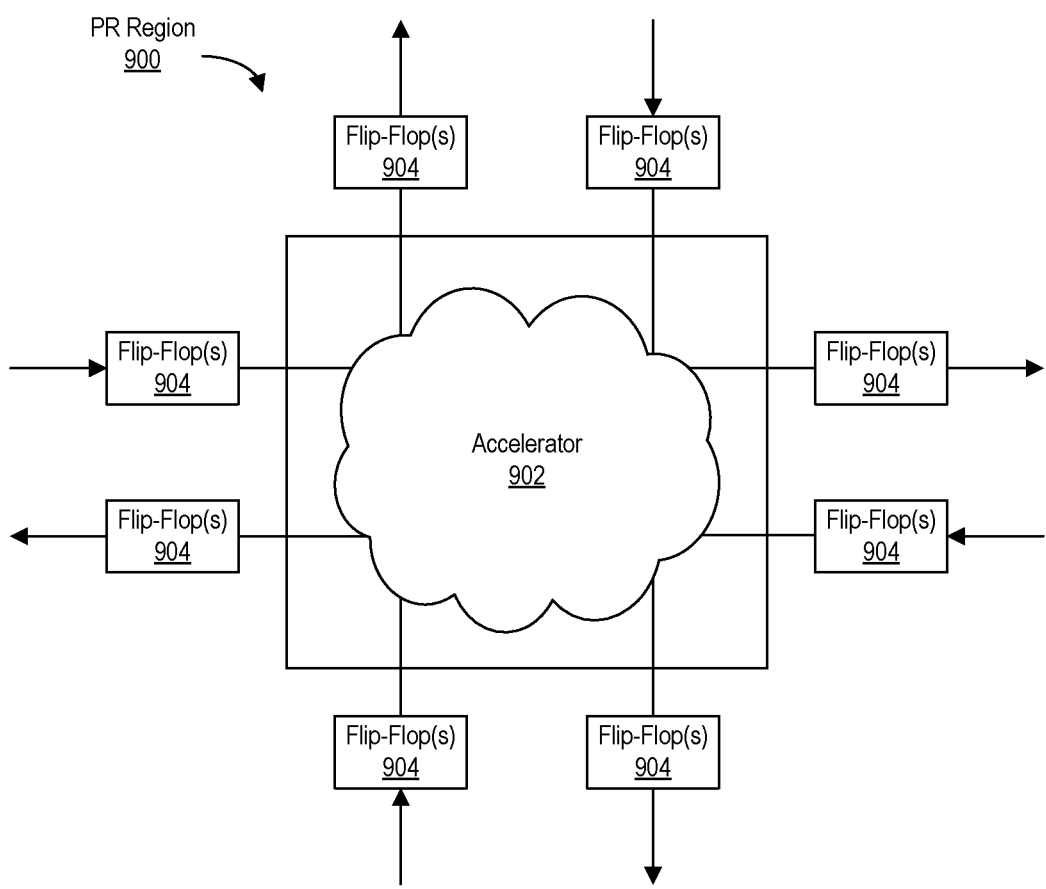
FIG. 9 illustrates an example of a partial reconfiguration region.

FIG. 9 illustrates an example of a PR region 900. PR region 900 illustrates connectivity of an accelerator 902 implemented therein to platform 504. In the example of FIG. 9, accelerator 902 has inputs and outputs that an electronic design automation (EDA) tool routes to known nodes of platform 504. These nodes of platform 504 may be flip-flops 904 (e.g., clocked nodes). By including flip-flops 904 for the inputs to accelerator 902 and for the outputs from accelerator 902, the circuitry of accelerator 902 is effectively isolated from the platform 504. Timing of accelerator 902 may be closed independently of timing of platform 504. Using this configuration ensures that the EDA tool is able to process the circuit design specifying an accelerator for implementation in a PR region separately. That is, each accelerator circuit design may be synthesized, placed, and routed independently of the other accelerator circuit designs and platform 504 despite the fact that the accelerator circuit designs may be implemented concurrently in programmable IC 132 (e.g., in different PR regions). This approach subdivides the implementation problem into a plurality of sub-problems that may be solved more easily and faster by the EDA tool than were the entirety of the particular accelerator circuit designs to be implemented in programmable IC 132 concurrently to be processed together as a monolithic circuit design within a single, larger PR region.

Figure 10:
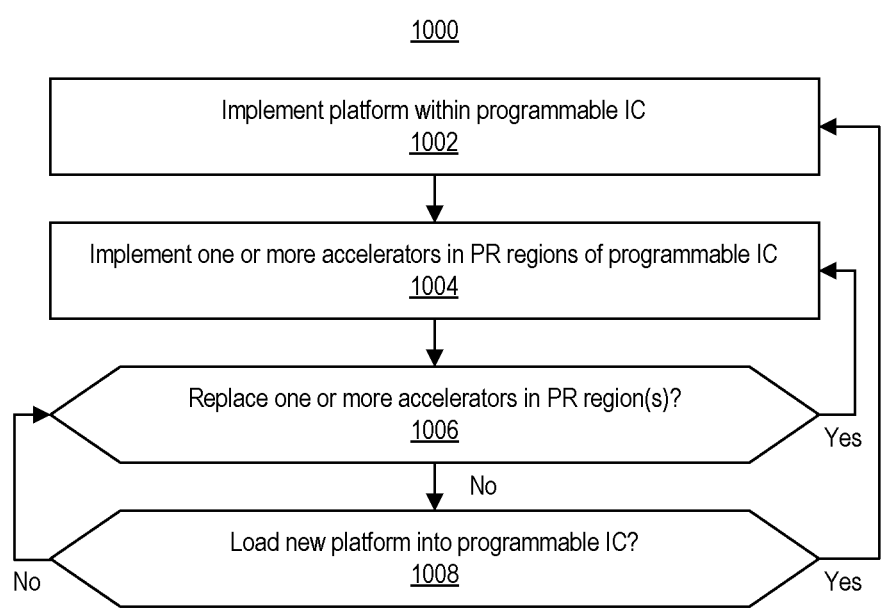
FIG. 10 illustrates another example method of operation for the computing environment described in connection with FIG. 1.

FIG. 10 illustrates another example method 1000 of operation for computing environment 100 described in connection with FIG. 1. In block 1002, a platform is implemented in the programmable IC. For example, the host system loads a configuration bitstream or partial configuration bitstream into the programmable IC implementing a platform therein. The platform supports a predetermined number of PR regions in which accelerators can be implemented. With the platform implemented in the programmable IC, the platform is capable of maintaining a communication link with the host system despite any subsequent reconfiguration of any of the PR regions.

In block 1004, one or more accelerators are implemented in PR regions of the programmable IC. The host system, for example, is capable of determining one or more accelerator binary images to be loaded into the programmable IC, where each accelerator binary image specifies an accelerator for one PR region. The host system, for example, may determine the particular accelerators to be implemented in the programmable IC based on a previously performed scheduling operation as described herein. The host system loads the accelerator binary images into the programmable IC to implement an accelerator in each of the PR regions of the programmable IC. As discussed, while PR regions undergo partial reconfiguration to implement accelerators therein, the platform is capable of continuing to operate uninterrupted and maintain the communication link with the host system.

In block 1006, the host system determines whether one or more accelerators in the PR region(s) are to be replaced. In one aspect, the host system may execute a program that controls and/or manages the loading of different accelerators and that generates an instruction to replace one or more accelerators. The host system may also receive a request for one or more different accelerators to be implemented in the programmable IC. In one aspect, the request is an indication that the accelerators currently implemented in the programmable IC have finished operation. In response to determining that one or more accelerators in the PR region(s) are to be replaced, method 1000 loops back to block 1004 to implement different accelerator(s). In response to determining that none of the accelerators are to be replaced, method 1000 may continue to block 1008.

In block 1008, the host system is capable of determining whether a new platform is to be loaded into the programmable IC. In one aspect, the host system may execute a program that controls and/or manages which of a plurality of platforms is to be loaded in the programmable IC. The host system may also receive a request for a particular platform to be loaded into the programmable IC. In response to determining that a new platform is to be loaded into the programmable IC, method 1000 loops back to block 1002 to implement the requested platform in the programmable IC. In response to determining that a new platform has not been requested, method 1000 may loop back to block 1006 to continue processing.

Figure 11:
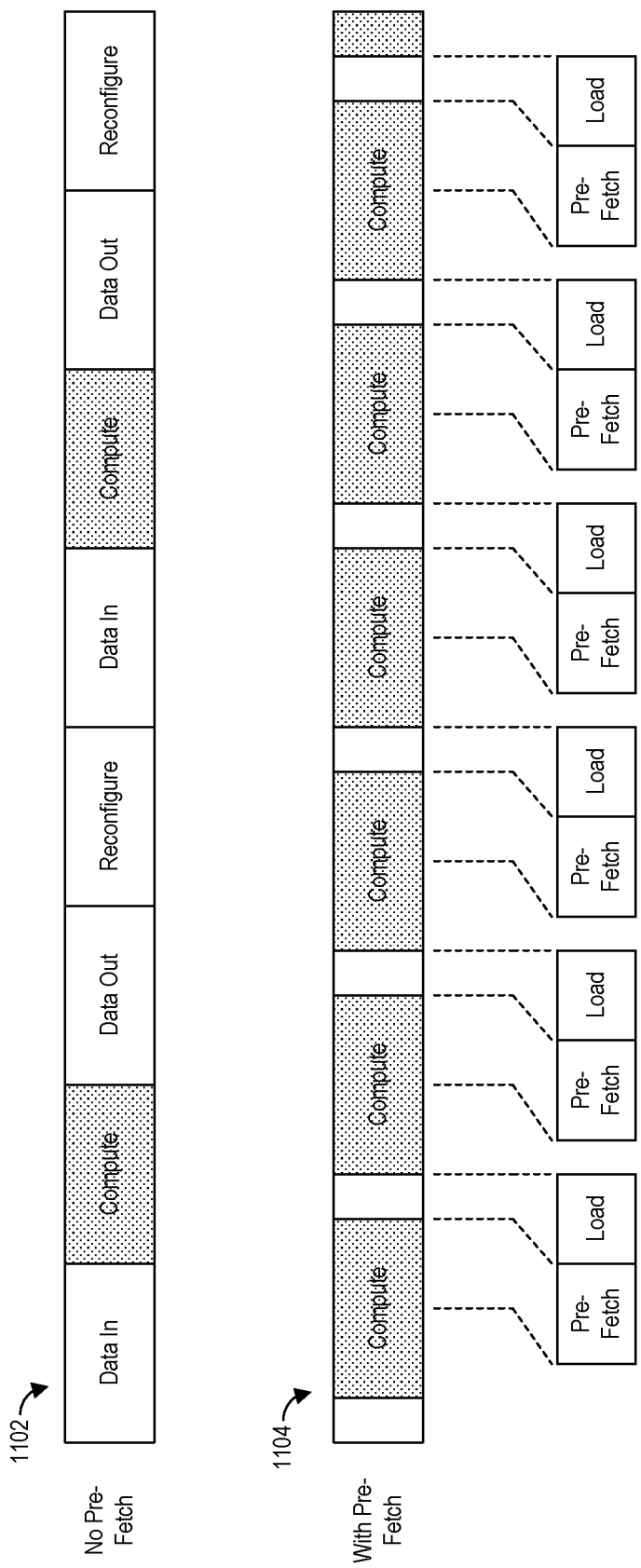
FIG. 11 illustrates example timelines showing compute time for a programmable IC using different configuration techniques.

FIG. 11 illustrates example timelines 1102 and 1104 showing compute time for the programmable IC using different configuration techniques. Timeline 1102 illustrates a conventional approach to hardware acceleration using a programmable IC. The conventional approach illustrated in timeline 1102 includes several phases shown as "Data In," "Compute," "Data Out," and "Reconfigure." The phases may be repeated as needed.

During the Data In phase, the host system provides data to be operated on, by the accelerators, to the programmable IC. The host system typically sends the data to the programmable IC over the PCIe connection to the programmable IC. Often, the data is stored in external volatile memory that is local to the programmable IC. The programmable IC must then load the data from the external memory (e.g., volatile memory 134) to memory within the programmable IC so that the accelerator(s) may operate on the data.

The Compute phase refers to the actual time that the programmable IC, e.g., the accelerator(s), is operating on the data. The Data Out phase involves the programmable IC writing data generated by the accelerator(s) to external memory and initiating the transfer of that data from the external memory to the host system over the PCIe connection. The Reconfigure phase includes the host system retrieving the accelerator binary image for the next accelerator to be implemented in the programmable IC from a data storage device. The data storage device may or may not be local to the host system and may require significant time for retrieval. Further, the host system must then download the accelerator binary image(s) to the hardware acceleration card and load the accelerator binary image(s) into the programmable IC.

Timeline 1104 illustrates a pre-fetch technique for hardware acceleration. In the pre-fetch technique, while the programmable IC is operating on data (e.g., during the Compute phase), the host system is pre-fetching the accelerator binary image(s) of the next accelerator(s) to be implemented in the programmable IC. For example, rather than waiting to detect a reconfiguration trigger event (e.g., such as the currently implemented accelerators indicating that processing has finished) to first fetch the next accelerator binary image(s), the host system is capable of retrieving the next accelerator binary image(s) at any point after the accelerator binary image(s) for the currently implemented accelerator(s) have been provided to the programmable IC and/or hardware acceleration card. The host system retrieves the next accelerator binary image(s) and downloads the next accelerator binary image(s) to the local volatile memory of the programmable IC (e.g., volatile memory 134). As such, when partial reconfiguration is eventually performed, the programmable IC may immediately load the next accelerator binary image(s) from the local volatile memory. This can significantly reduce the amount of time that the programmable IC is idle and increase the amount of time the programmable IC performs computations (e.g., increase the density of the compute phases).

Figure 12:
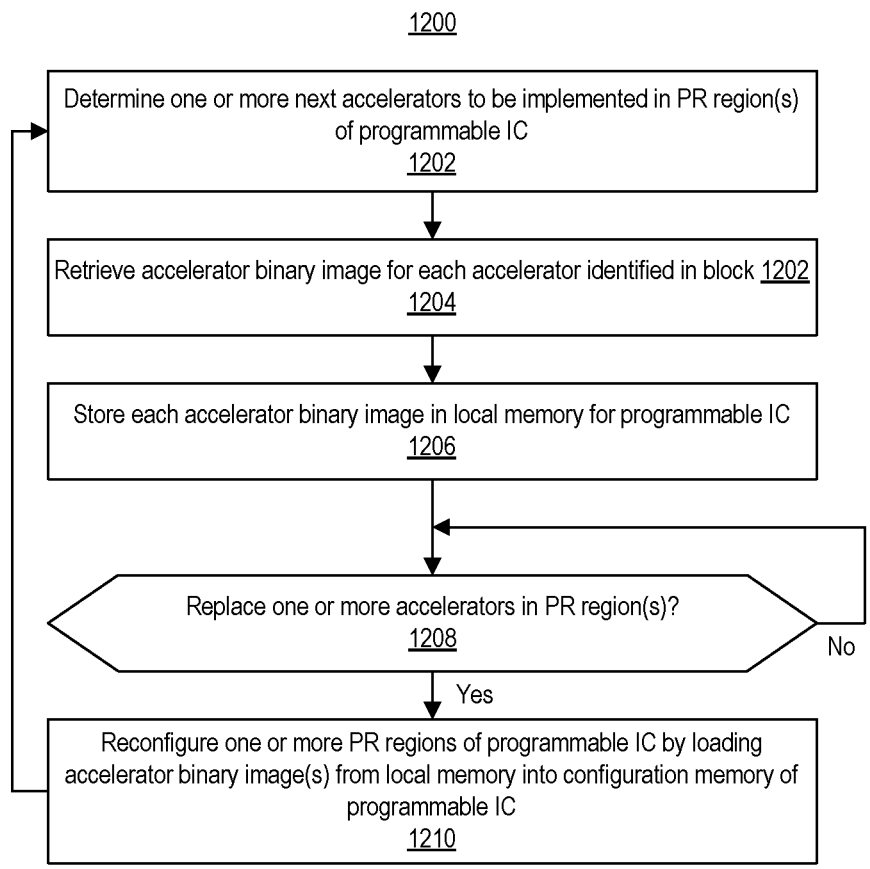
FIG. 12 illustrates an example method of pre-fetching accelerator binary images using the computing environment described in connection with FIG. 1.

FIG. 12 illustrates an example method 1200 of pre-fetching accelerator binary images using computing environment 100 described in connection with FIG. 1. Method 1200 may begin in a state where the programmable IC has been configured with a platform and accelerators have been implemented in the PR regions.

In block 1202, the host system is capable of determining one or more next accelerators that are to be implemented in PR region(s) of the programmable IC. In one aspect, the host system executes a hardware scheduler that has determined an order or sequence in which different accelerators or groups of accelerators are to be implemented in the programmable IC.

In block 1204, the host system is capable of retrieving the accelerator binary image for each accelerator identified in block 1202. The host system may retrieve the accelerator binary image(s) from a local data storage device or a networked (e.g., remote) data storage device. In another example, the host system may retrieve the accelerator binary image(s) from an archive data storage device.

In block 1206, the host system is capable of storing the accelerator binary images retrieved in block 1204 to the local memory of the programmable IC. The host system, for example, may send the accelerator binary image(s) retrieved in block 1204 to the hardware acceleration card. The platform operating in the programmable IC (e.g., the PCIe controller, DMA engine, and memory controller) are capable of storing the received accelerator binary image(s) in local memory (e.g., volatile memory 134).

The host system and programmable IC are capable of performing blocks 1202, 1204, and 1206 while any accelerators currently implemented in PR regions of the programmable IC continue to operate (e.g., operate in the compute phase processing data). That is, the host system and/or programmable IC are capable of implementing the pre-fetch technique prior to the currently implemented accelerators finishing processing. Further, blocks 1202, 1204, and 1206 may be performed by the host system and programmable IC prior to the occurrence or detection of a trigger event for reconfiguration of one or more of the PR regions (which may include the currently implemented accelerators finishing processing).

In block 1208, the host system determines whether one or more accelerators in the PR region(s) are to be replaced. In one aspect, the host system may execute a program that controls and/or manages the loading of different accelerators and that generates an instruction to replace one or more accelerators. The host system may also receive a request for one or more different (e.g., next) accelerators to be implemented in the programmable IC. As noted, the request may be an indication that the currently implemented accelerators have finished processing. In response to determining that one or more accelerators in the PR region(s) are to be replaced, method 1200 continues to block 1210. In response to determining that none of the accelerators are to be replaced, method 1200 may continue to loop so that the currently implemented accelerator(s) continue to operate until such time that the accelerator(s) in the programmable IC are to be replaced.

In block 1210, the host system initiates reconfiguration of one or more PR regions of the programmable IC. The host system, for example, can signal the programmable IC to load the accelerator binary image(s) from local memory into configuration memory of the programmable IC. In loading the accelerator binary image(s) from the local memory, the time needed to reconfigure the PR region(s) of the programmable IC may be significantly reduced.

Figure 13:
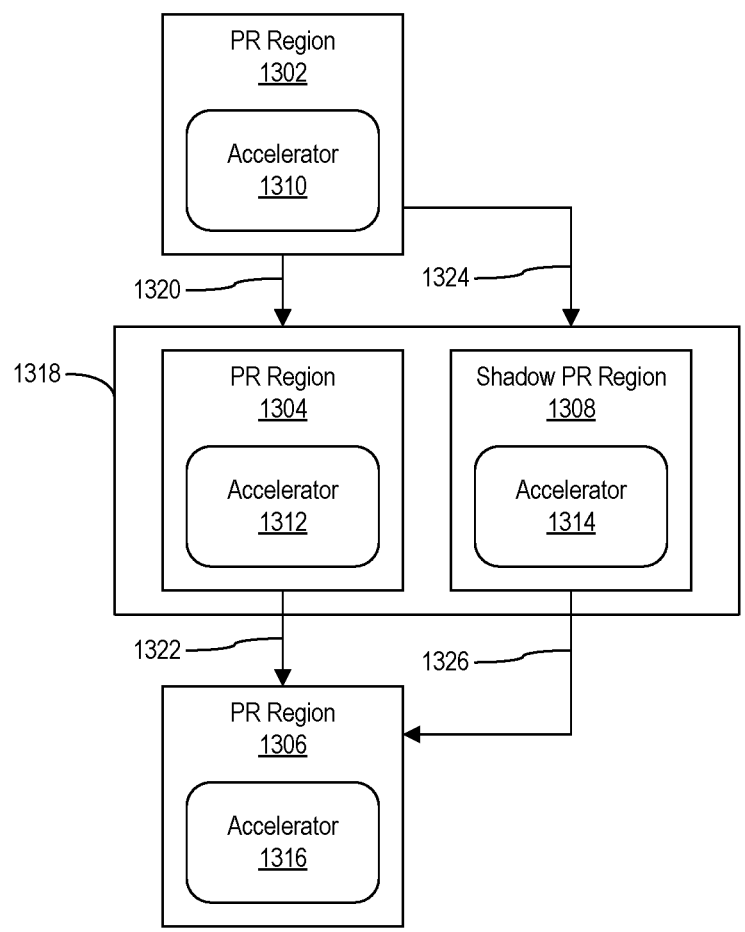
FIG. 13 illustrates an example implementation of a super partial reconfiguration region.

FIG. 13 illustrates an example implementation of a super PR region having a shadow PR region and a companion PR region. In the example of FIG. 13, a plurality of PR regions 1302, 1304, 1306, and 1308 for programmable IC 132 are shown. For purposes of illustration, the platform is not illustrated. It should be appreciated, however, that a platform may be provided and that the platform may provide, at least in part, the connectivity between PR regions 1302, 1304, 1306, and 1308 shown in FIG. 13. PR region 1302 implements accelerator 1310. PR region 1304 implements accelerator 1312. Shadow PR region 1308 implements accelerator 1314. PR region 1306 implements accelerator 1316.

In the example of FIG. 13, shadow PR region 1308 operates in coordination with PR region 1304. PR regions 1304 and 1308 may be collectively referred to as a "super PR region" 1318. Super PR region 1318 appears, from the outside of programmable IC 132, to be a single PR region albeit with little or no delay for reconfiguration. The two PR regions 1304 and 1308 may operate in a manner similar to that of a ping-pong buffer. For example, the data path illustrated in FIG. 13 begins in accelerator 1310, continues to either accelerator 1312 or to accelerator 1314, and continues to accelerator 1316. As such, only accelerator 1312 or accelerator 1314 is included and used within the data path at any given time. Accelerators 1312 and 1314, for example, may be alternates.

For purposes of illustration, PR regions 1302, 1304, and 1306 may be initially configured to implement accelerators 1310, 1312, and 1316, respectively. The data flow is from accelerator 1310, through communication interface 1320, to accelerator 1312, through communication interface 1322, to accelerator 1316. While accelerators 1310, 1312, and 1316 are operating, the host system is capable of using a pre-fetch technique as described herein applied to shadow PR region 1308. Despite shadow PR region 1308 not being used while PR region 1304 is in use, the host system configures shadow PR region 1308 to implement accelerator 1314, e.g., a different accelerator than currently used in PR region 1304, while the other accelerators including accelerator 1312 continue to operate. Accelerator 1314, for example, may be the next scheduled accelerator to be implemented in PR region 1304 following accelerator 1312.

At some point in the future, a trigger event is detected to reconfigure PR region 1304. Rather than wait for the trigger event and incur the delay of reconfiguring PR region 1304 at that time, shadow PR region 1308 has already been configured with accelerator 1314. The platform, which includes communication interfaces 1320, 1322, 1324, and 1326, is capable of redirecting output from accelerator 1310 to accelerator 1314 via communication interface 1324 (e.g., and disabling communication interface 1320). The platform further redirects the data path so that output generated by accelerator 1314 is provided to accelerator 1316 as input via communication interface 1326 (e.g., and disabling communication interface 1322). Shadow PR region 1308 is used as a "stand-in" or "proxy" for PR region 1304. For example, the host system is capable of providing a command or instruction to redirect the data flow, which causes the platform to activate and/or deactivate communication interfaces as described.

Once the data path is operative with accelerator 1310, to accelerator 1314, to accelerator 1316, the host system may perform a further pre-fetch type of operation to reconfigure PR region 1304 with a further, different accelerator. For example, the host system may configure PR region 1304 with the next accelerator scheduled for implementation while accelerators 1310, 1314, and 1316 operate. Subsequently, in response to detecting a trigger event to reconfigure PR region 1304, the platform simply redirects traffic from accelerator 1310 to the new accelerator already implemented in PR region 1304 using communication interface 1320 (e.g., disabling communication interface 1324). Further, the data generated by the newly implemented accelerator in PR region 1304 is directed to the input of accelerator 1316 via communication interface 1322 (e.g., disabling communication interface 1326).

By using one or more shadow PR regions, the delay incurred to reconfigure particular PR regions can be significantly reduced. From the outside of programmable IC 132, PR region 1304 and shadow PR region 1308 appear as a single PR region, e.g., super PR region 1318. Pre-fetch may be used in combination with shadow PR regions. In this example, however, either shadow PR region 1308 or PR region 1304 of super PR region 1318 is available at any given time, the host system may directly load the accelerator binary image into the available PR region (1304 and/or 1308). There is no need to first load the next accelerator binary image into local memory, though the host system still may do so.

Figure 14:
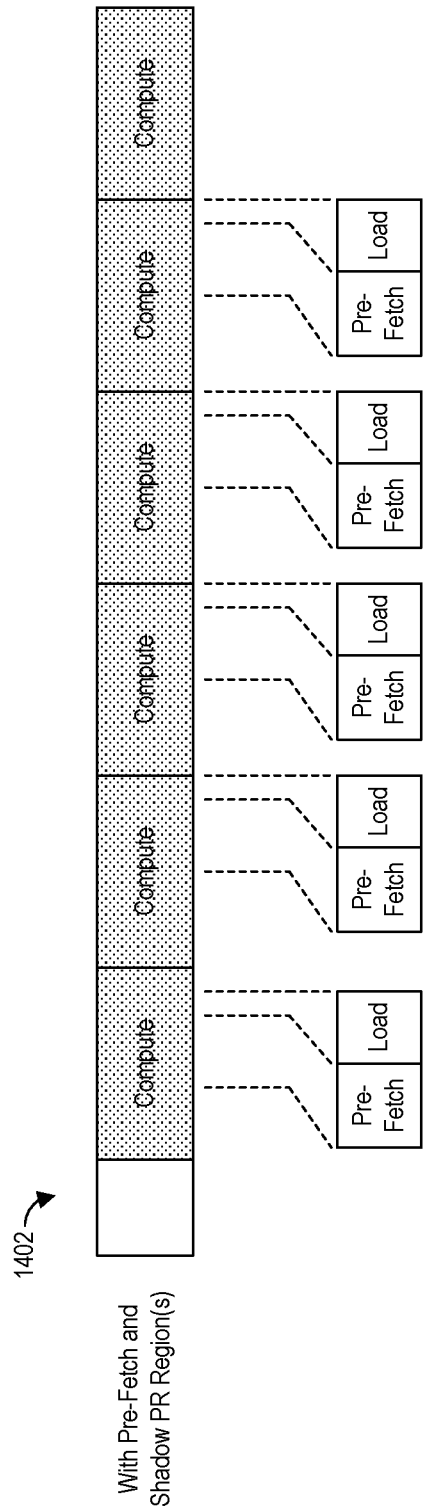
FIG. 14 illustrates an example timeline showing improved compute time when using the super partial reconfiguration region of FIG. 13.

FIG. 14 illustrates an example timeline 1402 showing improved compute time when using a super PR region as described in connection with FIG. 13. The example of FIG. 14 shows how the density of the compute phases in timeline 1402 increases since the time needed for reconfiguration is reduced through the use of pre-fetch and shadow PR region (s).

Figure 15:
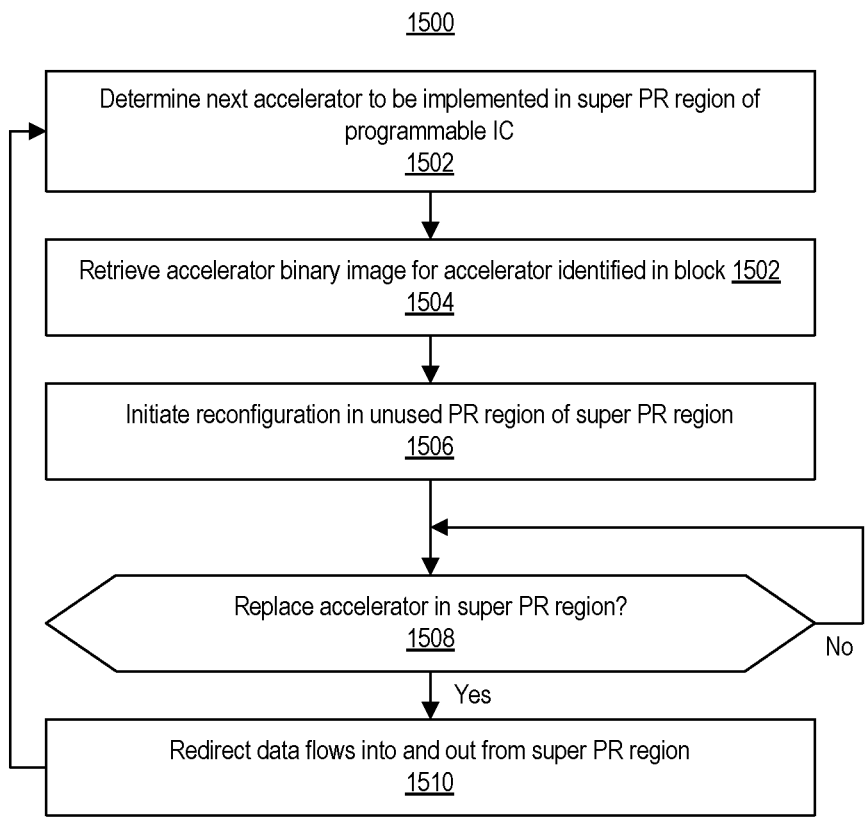
FIG. 15 illustrates a method of operation for the computing environment described in connection with FIG. 1 using a super PR region.

FIG. 15 illustrates a method 1500 of operation for computing environment 100 described in connection with FIG. 1 using a super PR region. Method 1500 may begin in a state where the programmable IC has been configured with a platform and accelerators have been implemented in the PR regions. Referring to the example of FIG. 13, the platform is implemented along with accelerator 1310 in PR region 1302, accelerator 1316 in PR region 1306, and accelerator 1312 in super PR region 1318. More particularly, regarding super PR region 1318, accelerator 1312 is implemented in PR region 1304 (also referred to herein as the "companion region"). Shadow PR region 1308 is not yet configured. In this initial state, however, super PR region 1318 appears to be configured with accelerator 1312.

In block 1502, the host system is capable of determining one or more next accelerators that are to be implemented in super PR region 1318. For example, the host system executes a hardware scheduler that has determined an order or sequence in which different accelerators or groups of accelerators are to be implemented in the programmable IC. The host system determines the next accelerator (e.g., accelerator 1314) scheduled for implementation in super PR region 1318 following accelerator 1312.

In block 1504, the host system is capable of retrieving the accelerator binary image identified in block 1502. The host system may retrieve the accelerator binary image from a local data storage device, a networked (e.g., remote) data storage device, an archive data storage device, or the like. In block 1506, the host system initiates reconfiguration of the unused PR region of super PR region 1318. In this iteration, the unused PR region is shadow PR region 1308. Accordingly, the host system causes the accelerator binary image retrieved in block 1504 to be loaded into the programmable IC to implement accelerator 1314 within PR region 1308.

The host system and programmable IC are capable of performing blocks 1502, 1504, and 1506 while any accelerators currently implemented in PR regions of the programmable IC (including PR region 1304) continue to operate (e.g., operate in the compute phase processing data). Further, blocks 1502, 1504, and 1506 may be performed by the host system and programmable IC prior to the occurrence or detection of a trigger event for reconfiguration of one or more of the PR regions including super PR region 1318. As noted, the trigger event may be the accelerator(s) finishing processing.

In block 1508, the host system determines whether the accelerator in the super PR region is to be replaced. In one aspect, the host system may execute a program that controls and/or manages the loading of different accelerators and that generates an instruction to replace an accelerator within the programmable IC. The host system may also receive a request for one or more different (e.g., next) accelerators to be implemented in super PR region 1318 of the programmable IC (e.g., an indication that the accelerator(s) completed processing). In response to determining that the accelerator in super PR region 1318 is to be replaced, method 1500 continues to block 1510. In response to determining that none of the accelerators are to be replaced, method 1500 may continue to loop so that the currently implemented accelerator(s) continue to operate until such time that one or more accelerators in the programmable IC are to be replaced.

In block 1510, the platform redirects the data flows into and out from the super PR region. More particularly, the platform, operating under control of the host system, redirects the data flows so that data generated by accelerator 1310 and/or output from PR region 1302 is provided to accelerator 1314 in shadow PR region 1308 instead of accelerator 1312 in companion PR region 1304. The platform further redirects the data flow so that the data generated by accelerator 1314 in shadow PR region 1308 is provided to PR region 1306 and/or accelerator 1316 as input. In this regard, the platform, while implemented in static circuitry, may be runtime programmable in that particular communication interfaces may be activated and/or deactivated as described.

In the example of FIG. 15, companion PR region 1304 and accelerator 1312 are initially operable while the shadow PR region 1308 and any accelerator implemented therein (e.g., accelerator 1314) are idle. In response to detecting a trigger condition as described in block 1508, the host system switches programmable IC 132 over to using shadow PR region 1308 and accelerator 1314. Shadow PR region 1308 and accelerator 1314 are effectively activated. In activating shadow PR region 1308, companion PR region 1304 and/or accelerator 1312 become idle.

Method 1500 may continue to operate. In subsequent iterations, the same or similar technique may be used where companion PR region 1304 of super PR region 1318, while not used or idle, is reconfigured to implement a next accelerator (e.g., the next scheduled accelerator following accelerator 1314). In the next iteration, for example, shadow PR region 1308 and accelerator 1314 are operable (e.g., activated) while companion PR region 1304 and any accelerator implemented therein are idle. In response to detecting a further trigger condition as described in block 1508, the host system switches programmable IC 132 over to using companion PR region 1304 and the next scheduled accelerator following accelerator 1314. Companion PR region 1304 and next accelerator are effectively activated. In activating companion PR region 1304, shadow PR region 1308 and/or accelerator 1314 become idle.

Method 1500 may iterate using a ping-pong technique for reconfiguring companion PR region 1304 and shadow PR region 1308 over time to reduce the amount of time needed to reconfigure the programmable IC. From a user's perspective outside of programmable IC 132, the super PR region appears to operate as a single PR region that requires zero or near zero configuration time.

Figure 16:
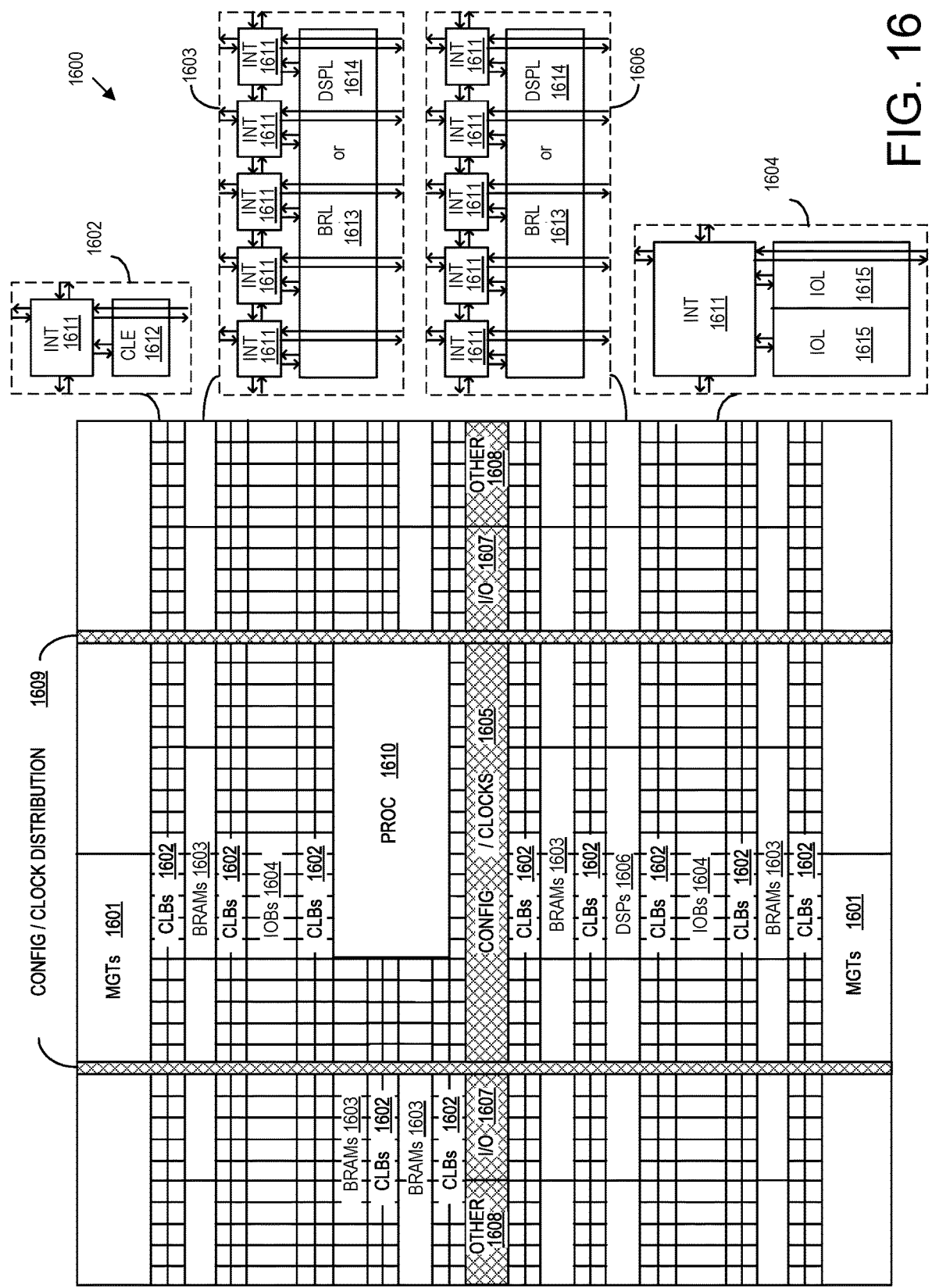
FIG. 16 illustrates an example architecture for a programmable IC.

FIG. 16 illustrates an example architecture 1600 for an IC. In one aspect, architecture 1600 may be implemented within a programmable IC such as programmable IC 132 described within this disclosure. For example, architecture 1600 may be used to implement a field programmable gate array (FPGA). Architecture 1600 may also be representative of a system-on-chip (SoC) type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 1600 includes several different types of programmable circuit, e.g., logic, blocks. For example, architecture 1600 may include a large number of different programmable tiles including multi-gigabit transceivers (MGTs) 1601, configurable logic blocks (CLBs) 1602, random access memory blocks (BRAMs) 1603, input/output blocks (IOBs) 1604, configuration and clocking logic (CONFIG/CLOCKS) 1605, digital signal processing blocks (DSPs) 1606, specialized I/O blocks 1607 (e.g., configuration ports and clock ports), and other programmable logic 1608 such as digital clock managers, analog-to-digital converters, system monitoring logic, and so forth.

In some ICs, each programmable tile includes a programmable interconnect element (INT) 1611 having standardized connections to and from a corresponding INT 1611 in each adjacent tile. Therefore, INTs 1611, taken together, implement the programmable interconnect structure for the illustrated IC. Each INT 1611 also includes the connections to and from the programmable logic element within the same tile, as shown by the examples included at the top of FIG. 16.

For example, a CLB 1602 may include a configurable logic element (CLE) 1612 that may be programmed to implement user logic plus a single INT 1611. A BRAM 1603 may include a BRAM logic element (BRL) 1613 in addition to one or more INTs 1611. Typically, the number of INTs 1611 included in a tile depends on the height of the tile. As pictured, a BRAM tile has the same height as five CLBs, but other numbers (e.g., four) also may be used. A DSP tile 1606 may include a DSP logic element (DSPL) 1614 in addition to an appropriate number of INTs 1611. An 10B 1604 may include, for example, two instances of an I/O logic element (IOL) 1615 in addition to one instance of an INT 1611. The actual I/O pads connected to IOL 1615 may not be confined to the area of IOL 1615.

In the example pictured in FIG. 16, a vertical area near the center of the die, e.g., formed of regions 1605, 1607, and 1608, may be used for configuration, clock, and other control logic. Vertical areas 1609 extending from this horizontal area may be used to distribute the clocks and configuration signals across the breadth of the programmable IC.

Some ICs utilizing the architecture illustrated in FIG. 16 include additional logic blocks that disrupt the regular columnar structure making up a large part of the IC. The additional logic blocks may be programmable blocks and/or dedicated circuitry. For example, a processor block depicted as PROC 1610 spans several columns of CLBs and BRAMs.

In one aspect, PROC 1610 may be implemented as dedicated circuitry, e.g., as a hardwired processor, that is fabricated as part of the die that implements the programmable circuitry of the IC. PROC 1610 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1610 may be omitted from architecture 1600 and replaced with one or more of the other varieties of the programmable blocks described. Further, such blocks may be utilized to form a "soft processor" in that the various blocks of programmable circuitry may be used to form a processor that can execute program code as is the case with PROC 1610.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 16 that are external to PROC 1610 such as CLBs 1602 and BRAMs 1603 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1610.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 1610 or a soft processor. In some cases, architecture 1600 includes a dedicated configuration processor that loads the configuration bitstream to the appropriate configuration memory and/or processor memory. The dedicated configuration processor does not execute user-specified program code. In other cases, architecture 1600 may utilize PROC 1610 to receive the configuration bitstream, load the configuration bitstream into appropriate configuration memory, and/or extract program code for execution.

FIG. 16 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 16 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1610 within the IC are for purposes of illustration only and are not intended as limitations.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "high-level programming language" or "HLL" means a programming language, or set of instructions, used to program a data processing system where the instructions have a strong abstraction from the details of the data processing system, e.g., machine language. For example, a high-level programming language may automate or hide aspects of operation of the data processing system such as memory management. The amount of abstraction typically defines how "high-level" the programming language is. Using a high-level programming language frees the user from dealing with registers, memory addresses, and other low level features of the data processing system upon which the high-level programming language will execute. For example, a high-level programming language may include little or no instructions that translate directly, on a one-to-one basis, into a native opcode of a data processing system. Examples of high-level programming languages include, but are not limited to, C, C++, SystemC, OpenCL C, or the like.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method can includes building, using computer hardware, a call graph from program code including a plurality of functions, associating, using the computer hardware, each function of the plurality of functions with an accelerator binary image specifying a hardware accelerated version of the associated function, and determining, using the computer hardware, which accelerator binary images are data independent based on the call graph. The method also includes scheduling, using the computer hardware, the accelerator binary images for implementation in a programmable IC within each of a plurality of partial reconfiguration regions based on data independence.

In another aspect, the scheduling includes assigning the accelerator binary images to a plurality of groups, wherein each group of the plurality of groups includes only accelerator binary images that are data independent of each other.

In another aspect, the method includes, for each group of the plurality of groups, scheduling each accelerator binary image of the group for concurrent implementation in the programmable IC.

In another aspect, the method includes implementing each accelerator binary image of a first group of the plurality of groups in the programmable IC concurrently, wherein each accelerator binary image of the first group is implemented in a different partial reconfiguration region of the plurality of partial reconfiguration regions.

In another aspect, the method includes partially reconfiguring the programmable IC to replace the first group with a second group of the accelerator binary images, wherein the accelerator binary images of the second group are implemented concurrently and each accelerator binary image of the second group is implemented in a different partial reconfiguration region.

In another aspect, the method includes implementing platform circuitry within a static region. Each partial reconfiguration region can be at least partially framed by the platform circuitry. Adjacent ones of the plurality of partial reconfiguration regions are separated by a portion of the platform circuitry.

In another aspect, the method includes implementing a first accelerator binary image in a first partial reconfiguration region of the plurality of partial reconfiguration regions and loading a second accelerator binary image in a local memory of the programmable IC prior to detecting a trigger event initiating implementation of the second accelerator binary image in the first partial reconfiguration region.

In another aspect, the method includes implementing a first accelerator binary image in a first partial reconfiguration region of the plurality of partial reconfiguration regions and implementing a second accelerator binary image in a second partial reconfiguration region of the plurality of partial reconfiguration regions. The first partial reconfiguration region can be operable while the second partial reconfiguration region is idle. The method can also include, in response to detecting a trigger condition, switching over to the second partial reconfiguration region and activating the second partial reconfiguration region.

In another aspect, the method includes, in response to the trigger condition, implementing a third accelerator binary image in the first partial reconfiguration region, wherein the first partial reconfiguration region is idle and remains idle until a further trigger condition is detected.

A system can include a processor configured to initiate operations. The operations include building a call graph from program code including a plurality of functions, associating each function of the plurality of functions with an accelerator binary image specifying a hardware accelerated version of the associated function, and determining which accelerator binary images are data independent based on the call graph. The operations also include scheduling the accelerator binary images for implementation in a programmable IC within each of a plurality of partial reconfiguration regions based on data independence.

In another aspect, the method can include building a data structure specifying data flows from the program code, wherein the determining which accelerator binary images are data independent is performed using the data structure.

In another aspect, the scheduling includes assigning the accelerator binary images to a plurality of groups, wherein each group of the plurality of groups includes only accelerator binary images that are data independent of each other.

In another aspect, the processor is configured to initiate operations including, for each group of the plurality of groups, scheduling each accelerator binary image of the group for concurrent implementation in the programmable IC.

In another aspect, the processor is configured to initiate operations including implementing each accelerator binary image of a first group of the plurality of groups in the programmable IC concurrently, wherein each accelerator binary image of the first group is implemented in a different partial reconfiguration region of the programmable IC.

In another aspect, the processor is configured to initiate operations including partially reconfiguring the programmable IC to replace the first group with a second group of the accelerator binary images, wherein the accelerator binary images of the second group are implemented concurrently and each accelerator binary image of the second group is implemented in a different partial reconfiguration region.

In another aspect, the processor is configured to initiate operations including implementing platform circuitry within a static region. Each partial reconfiguration region can be at least partially framed by the platform circuitry. Adjacent ones of the plurality of partial reconfiguration regions are separated by a portion of the platform circuitry.

In another aspect, the processor is configured to initiate operations including implementing a first accelerator binary image in a first partial reconfiguration region of the plurality of partial reconfiguration regions and loading a second accelerator binary image in a local memory of the programmable IC prior to detecting a trigger event initiating implementation of the second accelerator binary image in the first partial reconfiguration region.

In another aspect, the processor is configured to initiate operations including implementing a first accelerator binary image in a first partial reconfiguration region of the plurality of partial reconfiguration regions and implementing a second accelerator binary image in a second partial reconfiguration region of the plurality of partial reconfiguration regions. The first partial reconfiguration region can be operable while the second partial reconfiguration region is idle. The processor may be further configured to initiate operations including, in response to detecting a trigger condition, switching over to the second partial reconfiguration region and activating the second partial reconfiguration region.

In another aspect, the processor is configured to initiate operations including, in response to the trigger condition, implementing a third accelerator binary image in the first partial reconfiguration region, wherein the first partial reconfiguration region is idle and remains idle until a further trigger condition is detected.

In another aspect, a computer program product includes a computer readable storage medium having program code stored thereon. The program code is executable by computer hardware to perform operations. The operations include building a call graph from program code including a plurality of functions, associating each function of the plurality of functions with an accelerator binary image specifying a hardware accelerated version of the associated function, and determining which accelerator binary images are data independent based on the call graph. The operations also include scheduling the accelerator binary images for implementation in a programmable IC within each of a plurality of partial reconfiguration regions based on data independence.

In another aspect, the scheduling includes assigning the accelerator binary images to a plurality of groups, wherein each group of the plurality of groups includes only accelerator binary images that are data independent of each other.

In another aspect, the operations include, for each group of the plurality of groups, scheduling each accelerator binary image of the group for concurrent implementation in the programmable IC.

In another aspect, the operations include implementing each accelerator binary image of a first group of the plurality of groups in the programmable IC concurrently, wherein each accelerator binary image of the first group is implemented in a different partial reconfiguration region of the plurality of partial reconfiguration regions.

In another aspect, the operations include partially reconfiguring the programmable IC to replace the first group with a second group of the accelerator binary images, wherein the accelerator binary images of the second group are implemented concurrently and each accelerator binary image of the second group is implemented in a different partial reconfiguration region.

In another aspect, the operations include implementing platform circuitry within a static region. Each partial reconfiguration region can be at least partially framed by the platform circuitry. Adjacent ones of the plurality of partial reconfiguration regions are separated by a portion of the platform circuitry.

In another aspect, the operations include implementing a first accelerator binary image in a first partial reconfiguration region of the plurality of partial reconfiguration regions and loading a second accelerator binary image in a local memory of the programmable IC prior to detecting a trigger event initiating implementation of the second accelerator binary image in the first partial reconfiguration region.

In another aspect, the operations include implementing a first accelerator binary image in a first partial reconfiguration region of the plurality of partial reconfiguration regions and implementing a second accelerator binary image in a second partial reconfiguration region of the plurality of partial reconfiguration regions. The first partial reconfiguration region can be operable while the second partial reconfiguration region is idle. The method can also include, in response to detecting a trigger condition, switching over to the second partial reconfiguration region and activating the second partial reconfiguration region.

In another aspect, the operations include, in response to the trigger condition, implementing a third accelerator binary image in the first partial reconfiguration region, wherein the first partial reconfiguration region is idle and remains idle until a further trigger condition is detected.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
associating, using computer hardware, each function of a plurality of functions from program code with an accelerator binary image specifying a hardware accelerated version of the associated function;
determining, using the computer hardware, which accelerator binary images are data independent; and
scheduling, using the computer hardware, the accelerator binary images for implementation in a programmable integrated circuit within each of a plurality of partial reconfiguration regions based on data independence;
wherein the scheduling includes assigning the accelerator binary images to a plurality of groups, wherein each group of the plurality of groups includes only accelerator binary images that are data independent of each other.

2. The method of claim 1, further comprising:
building a data structure specifying data flows from the program code, wherein the determining which accelerator binary images are data independent is performed using the data structure.

3. The method of claim 1, further comprising:
for each group of the plurality of groups, scheduling each accelerator binary image of the group for concurrent implementation in the programmable integrated circuit.

4. The method of claim 1, further comprising:
implementing each accelerator binary image of a first group of the plurality of groups in the programmable integrated circuit concurrently, wherein each accelerator binary image of the first group is implemented in a different partial reconfiguration region of the plurality of partial reconfiguration regions.

5. The method of claim 4, further comprising:
partially reconfiguring the programmable integrated circuit to replace the first group with a second group of the accelerator binary images, wherein the accelerator binary images of the second group are implemented concurrently and each accelerator binary image of the second group is implemented in a different partial reconfiguration region.

6. The method of claim 1, further comprising:
implementing platform circuitry within a static region;
wherein each partial reconfiguration region is at least partially framed by the platform circuitry; and
wherein adjacent ones of the plurality of partial reconfiguration regions are separated by a portion of the platform circuitry.

7. The method of claim 1, further comprising:
implementing a first accelerator binary image in a first partial reconfiguration region of the plurality of partial reconfiguration regions; and
loading a second accelerator binary image in a local memory of the programmable integrated circuit prior to detecting a trigger event initiating implementation of the second accelerator binary image in the first partial reconfiguration region.

8. The method of claim 1, further comprising:
implementing a first accelerator binary image in a first partial reconfiguration region of the plurality of partial reconfiguration regions;
implementing a second accelerator binary image in a second partial reconfiguration region of the plurality of partial reconfiguration regions;
wherein the first partial reconfiguration region is operable while the second partial reconfiguration region is idle; and
in response to detecting a trigger condition, switching over to the second partial reconfiguration region and activating the second partial reconfiguration region.

9. The method of claim 8, further comprising:
in response to the trigger condition, implementing a third accelerator binary image in the first partial reconfiguration region, wherein the first partial reconfiguration region is idle and remains idle until a further trigger condition is detected.

10. A system, comprising:
a processor configured to initiate operations including:
associating each function of a plurality of functions from program code with an accelerator binary image specifying a hardware accelerated version of the associated function;
determining which accelerator binary images are data independent;
scheduling the accelerator binary images for implementation in a programmable integrated circuit within each of a plurality of partial reconfiguration regions based on data independence;
implementing a first accelerator binary image in a first partial reconfiguration region of the plurality of partial reconfiguration regions; and
loading a second accelerator binary image in a local memory of the programmable integrated circuit prior to detecting a trigger event initiating implementation of the second accelerator binary image in the first partial reconfiguration region.

11. The system of claim 10, wherein the scheduling comprises:
assigning the accelerator binary images to a plurality of groups, wherein each group of the plurality of groups includes only accelerator binary images that are data independent of each other.

12. The system of claim 11, wherein the processor is configured to initiate operations comprising:
for each group of the plurality of groups, scheduling each accelerator binary image of the group for concurrent implementation in the programmable integrated circuit.

13. The system of claim 11, wherein the processor is configured to initiate operations comprising:
implementing each accelerator binary image of a first group of the plurality of groups in the programmable integrated circuit concurrently, wherein each accelerator binary image of the first group is implemented in a different partial reconfiguration region of the programmable integrated circuit.

14. The system of claim 13, wherein the processor is configured to initiate operations comprising:
partially reconfiguring the programmable integrated circuit to replace the first group with a second group of the accelerator binary images, wherein the accelerator binary images of the second group are implemented concurrently and each accelerator binary image of the second group is implemented in a different partial reconfiguration region.

15. The system of claim 10, wherein the processor is configured to initiate operations comprising:
implementing platform circuitry within a static region;
wherein each partial reconfiguration region is at least partially framed by the platform circuitry; and wherein adjacent ones of the plurality of partial reconfiguration regions are separated by a portion of the platform circuitry.

16. The system of claim 10, wherein the processor is configured to initiate operations comprising:
    implementing the second accelerator binary image in a second partial reconfiguration region of the plurality of partial reconfiguration regions;
    wherein the first partial reconfiguration region is operable while the second partial reconfiguration region is idle; and
    in response to detecting a trigger condition, switching over to the second partial reconfiguration region and activating the second partial reconfiguration region.

17. The system of claim 16, wherein the processor is configured to initiate operations comprising:
    in response to the trigger condition, implementing a third accelerator binary image in the first partial reconfiguration region, wherein the first partial reconfiguration region is idle and remains idle until a further trigger condition is detected.

18. A method, comprising:

implementing a first accelerator binary image in a first partial reconfiguration region of a plurality of partial reconfiguration regions of an integrated circuit;

implementing a second accelerator binary image in a second partial reconfiguration region of the plurality of partial reconfiguration regions;

wherein the first partial reconfiguration region is operable while the second partial reconfiguration region is idle; and in response to detecting a trigger condition, switching over to the second partial reconfiguration region, activating the second partial reconfiguration region, and implementing a third accelerator binary image in the first partial reconfiguration region;

wherein the first partial reconfiguration region is idle and remains idle until a further trigger condition is detected.

* * * * *